May 16, 1961  R. E. J. NORDQUIST  2,984,365
CAN STACKING APPARATUS

Filed Dec. 19, 1957  15 Sheets-Sheet 1

INVENTOR.
RONALD E. J. NORDQUIST
BY Leland R. McCann
George W. Reiber
ATTORNEYS

May 16, 1961  R. E. J. NORDQUIST  2,984,365
CAN STACKING APPARATUS

Filed Dec. 19, 1957  15 Sheets-Sheet 2

INVENTOR.
RONALD E. J. NORDQUIST
BY Leland R. McCann
George W. Reiber
ATTORNEYS

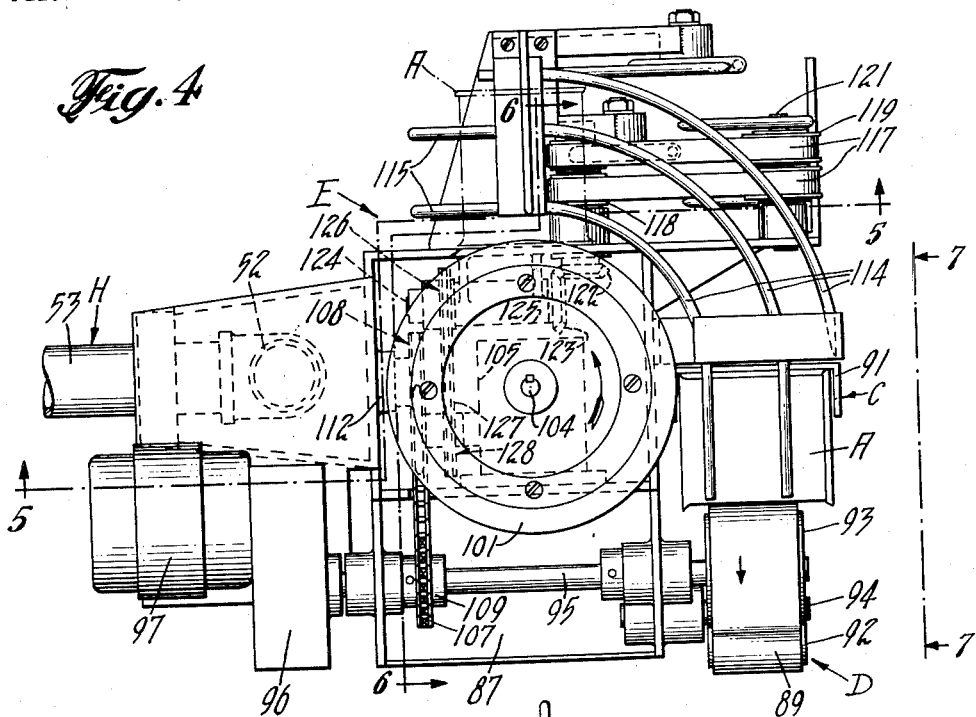
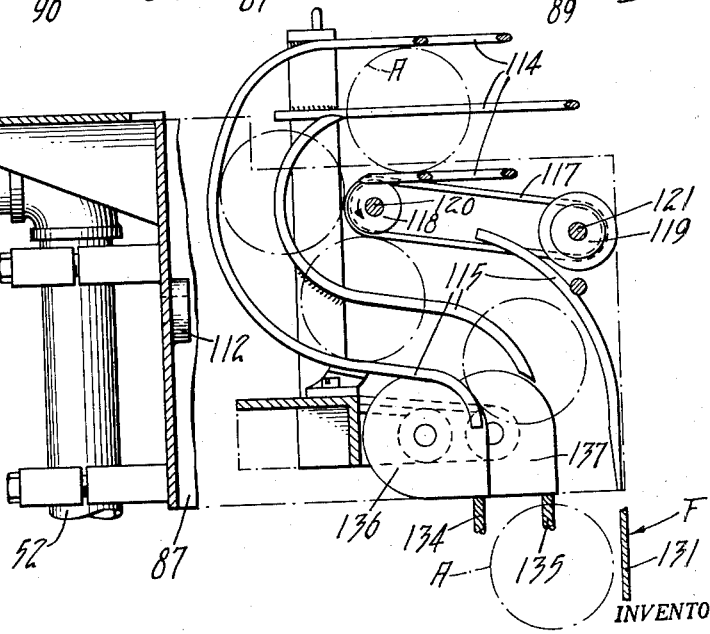

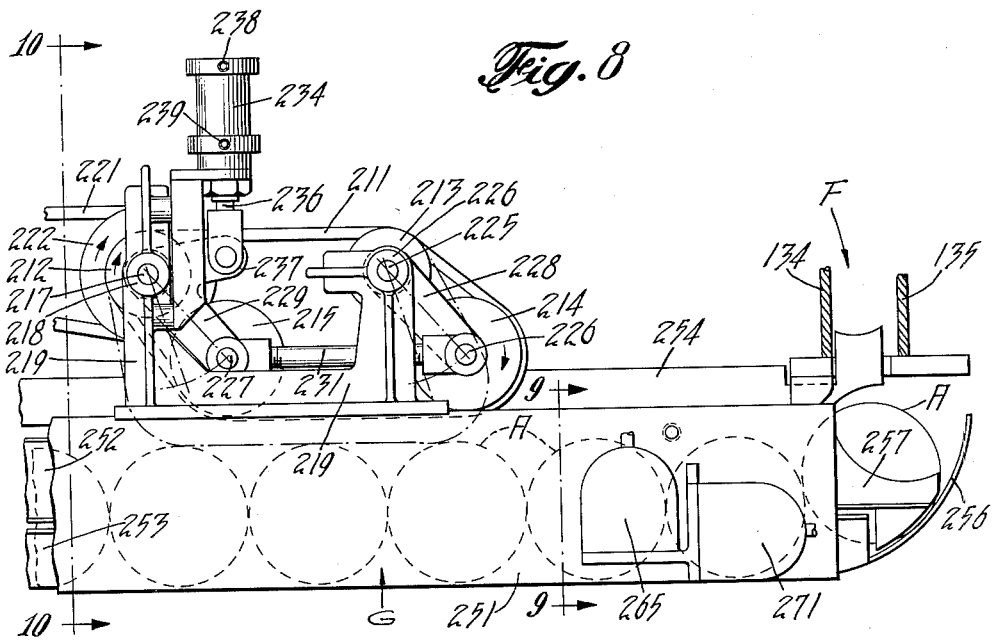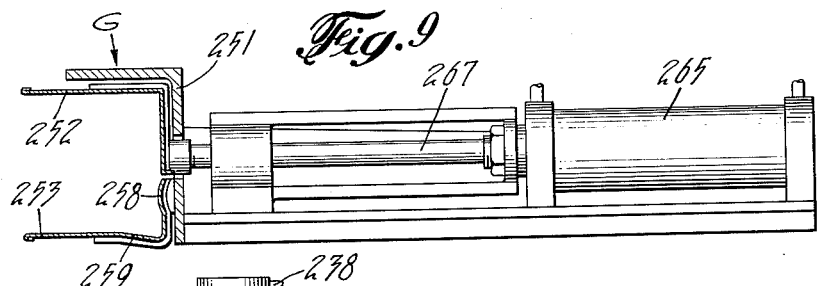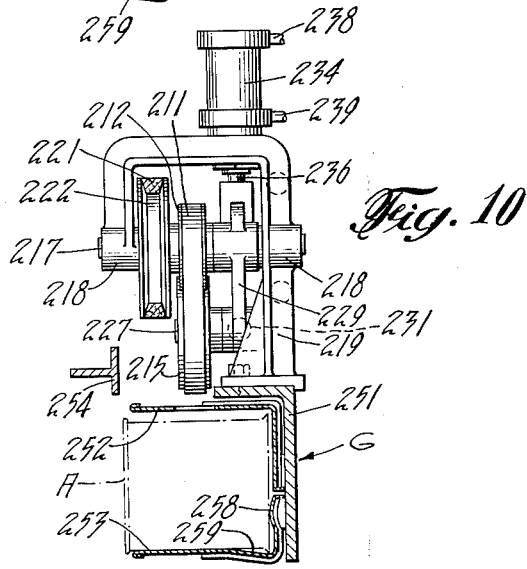

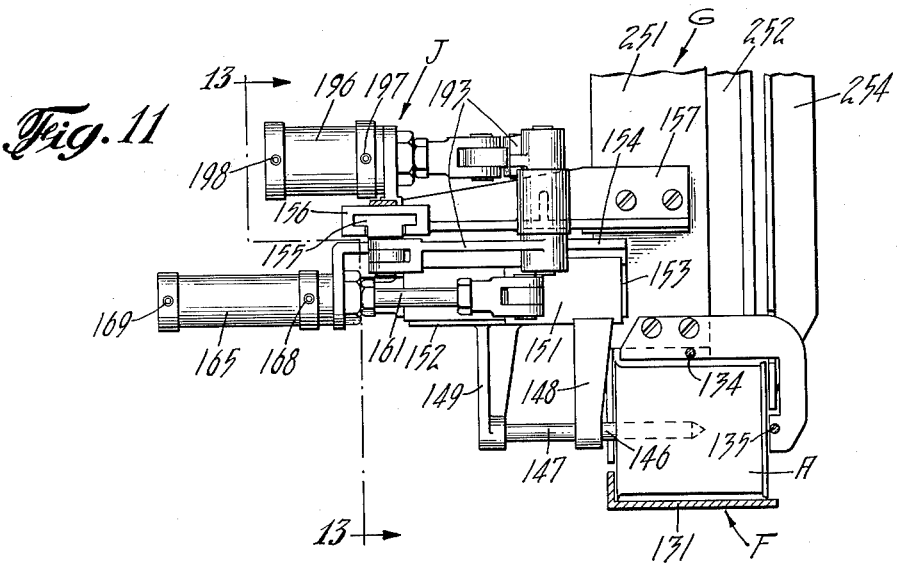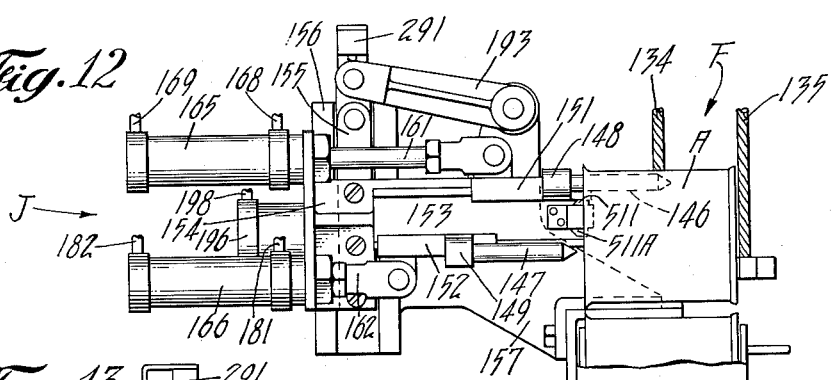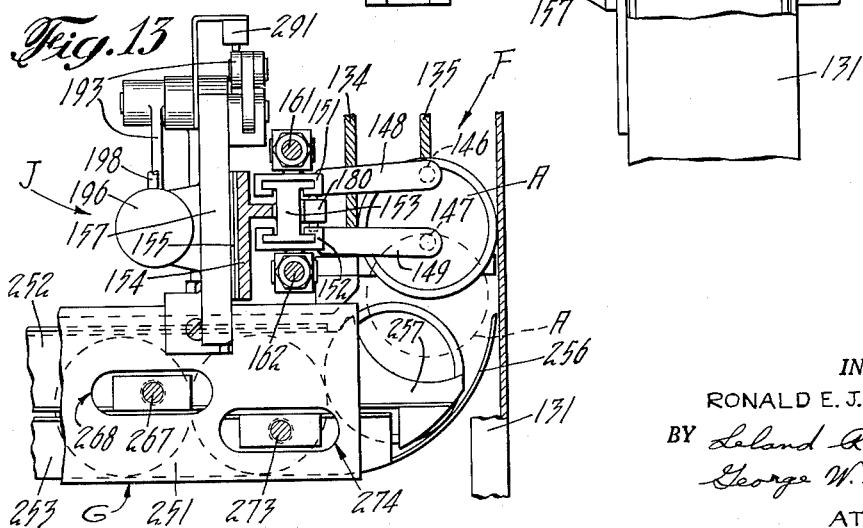

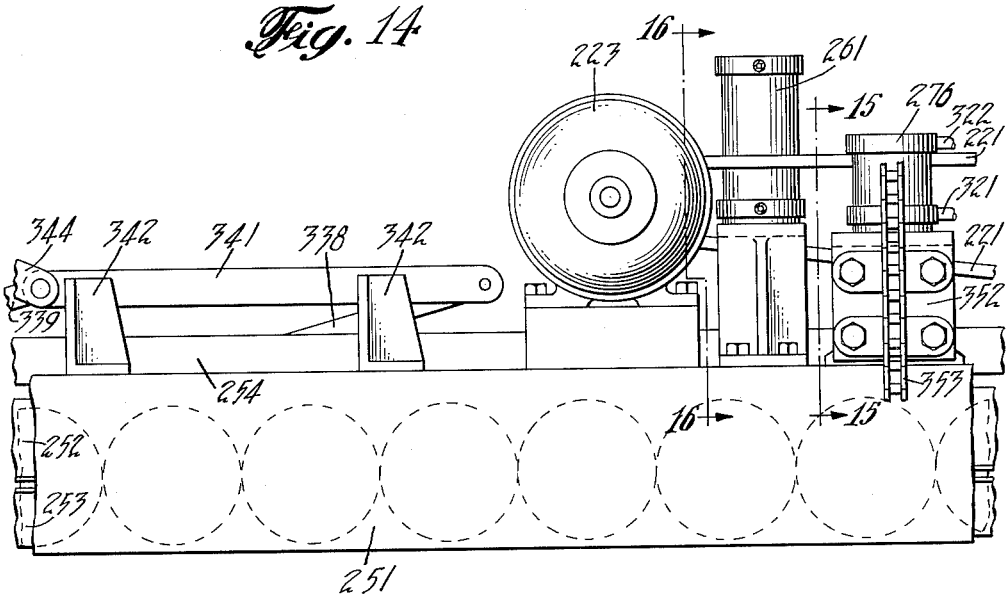
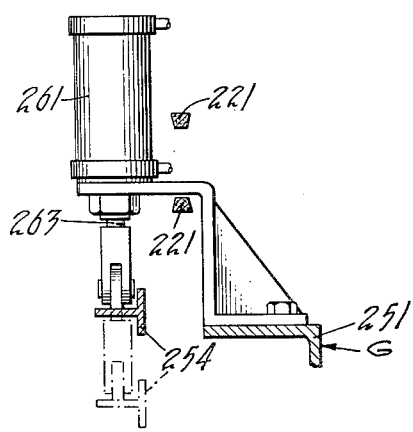
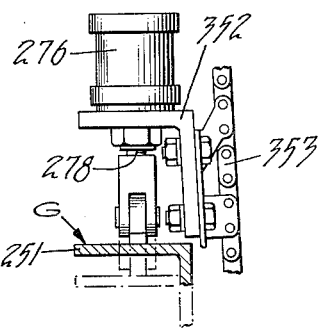

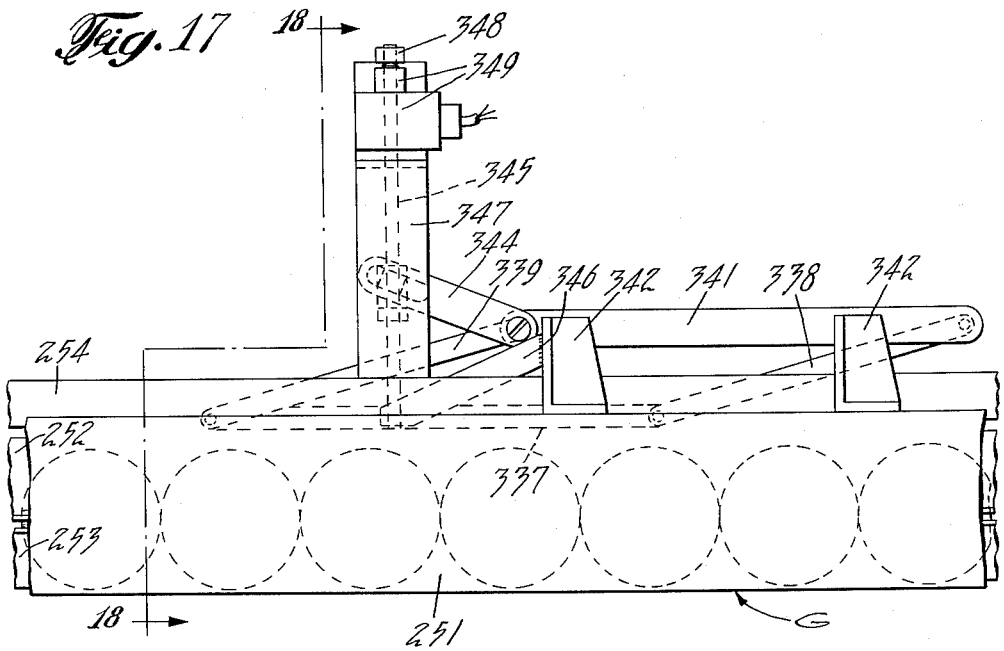
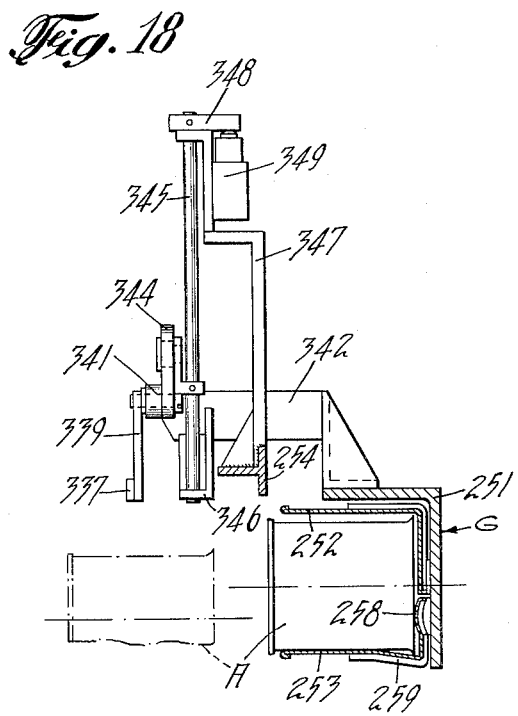
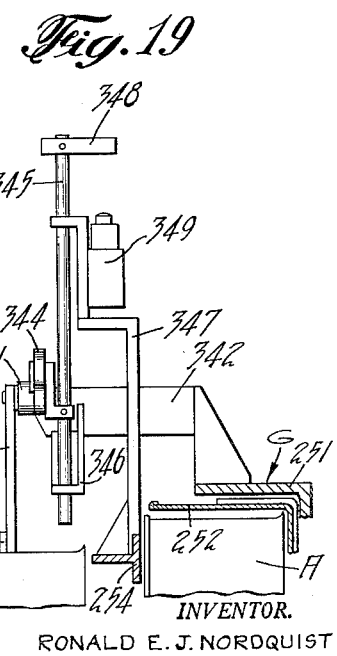
INVENTOR.
RONALD E. J. NORDQUIST
BY Leland R. McCann
George W. Reiber
ATTORNEYS

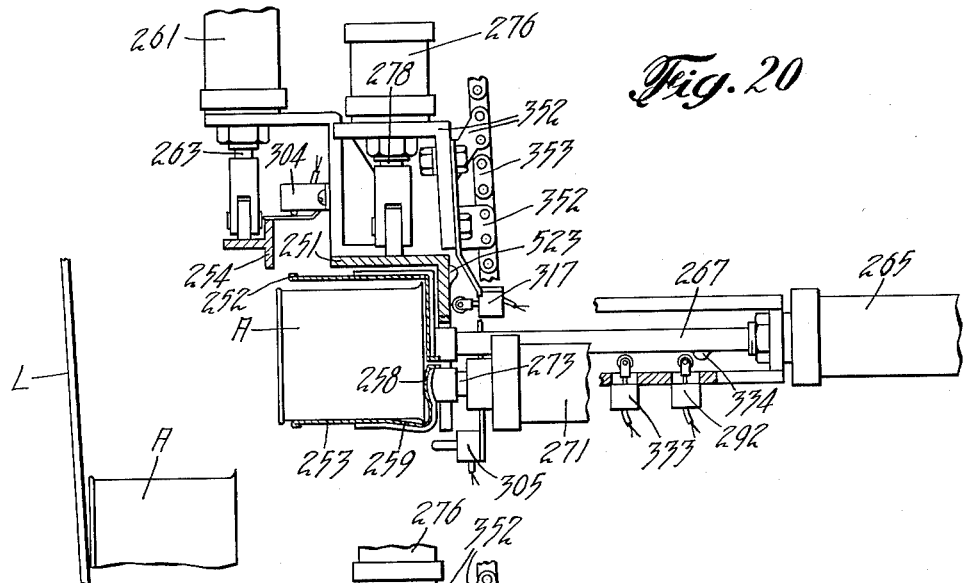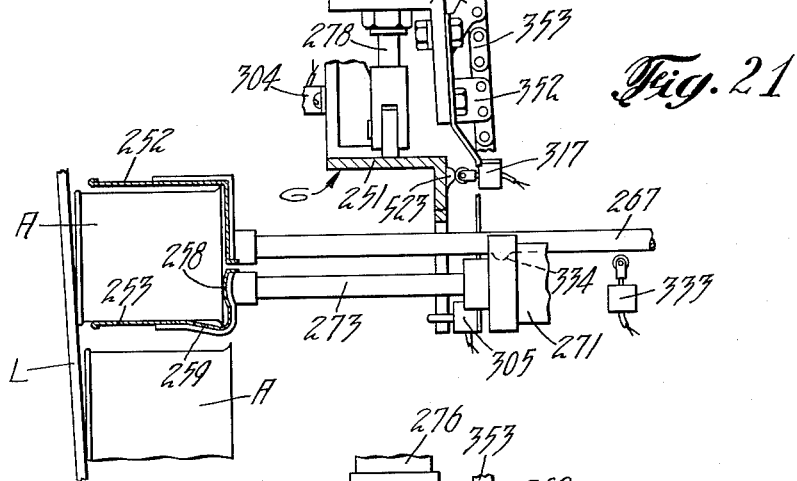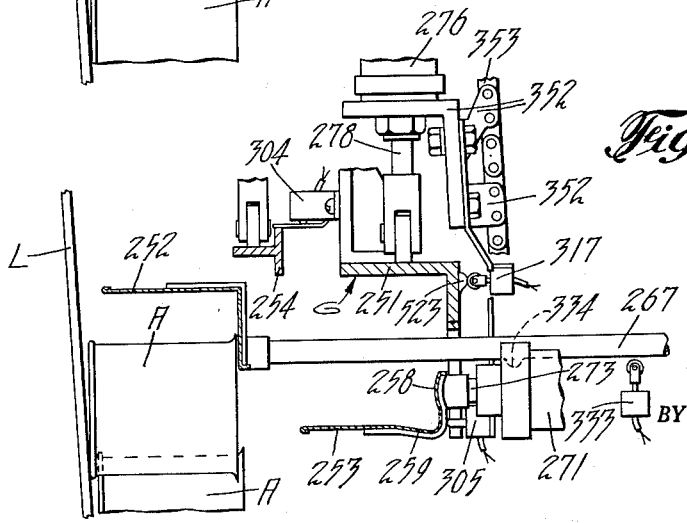

May 16, 1961   R. E. J. NORDQUIST   2,984,365
CAN STACKING APPARATUS
Filed Dec. 19, 1957   15 Sheets-Sheet 10
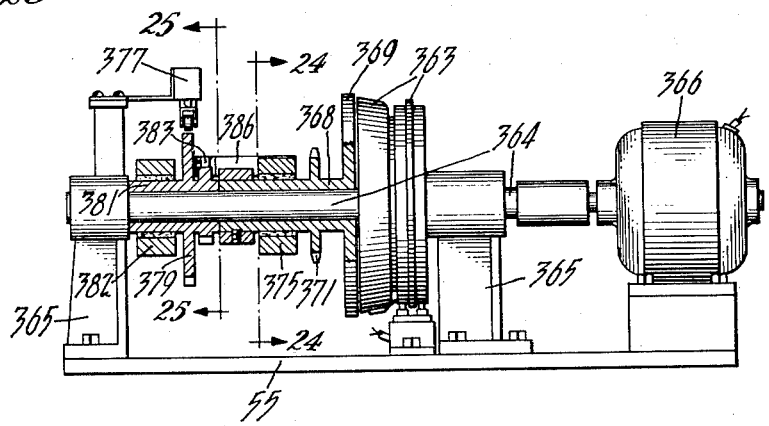
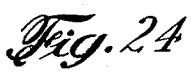
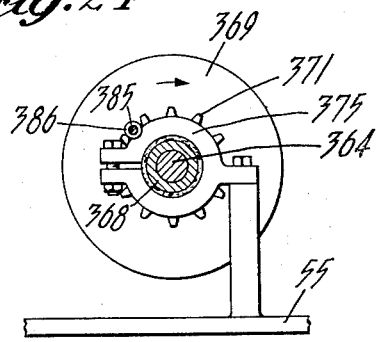
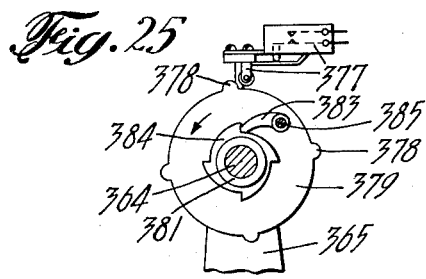
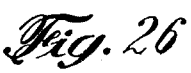
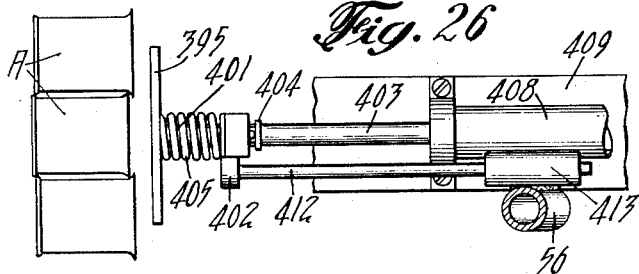
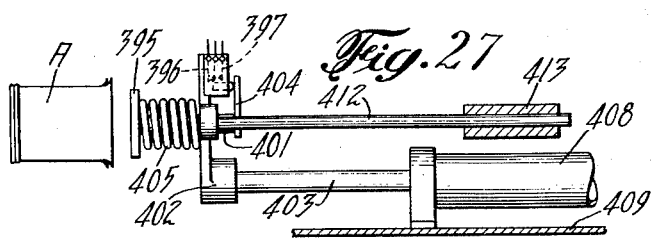
INVENTOR.
RONALD E. J. NORDQUIST
BY Leland R. McCann
George W. Rauber
ATTORNEYS May 16, 1961

R. E. J. NORDQUIST 2,984,365

CAN STACKING APPARATUS

Filed Dec. 19, 1957

INVENTOR.
RONALD E. J. NORDQUIST
BY Leland R. McCann
George W. Reiber
ATTORNEYS

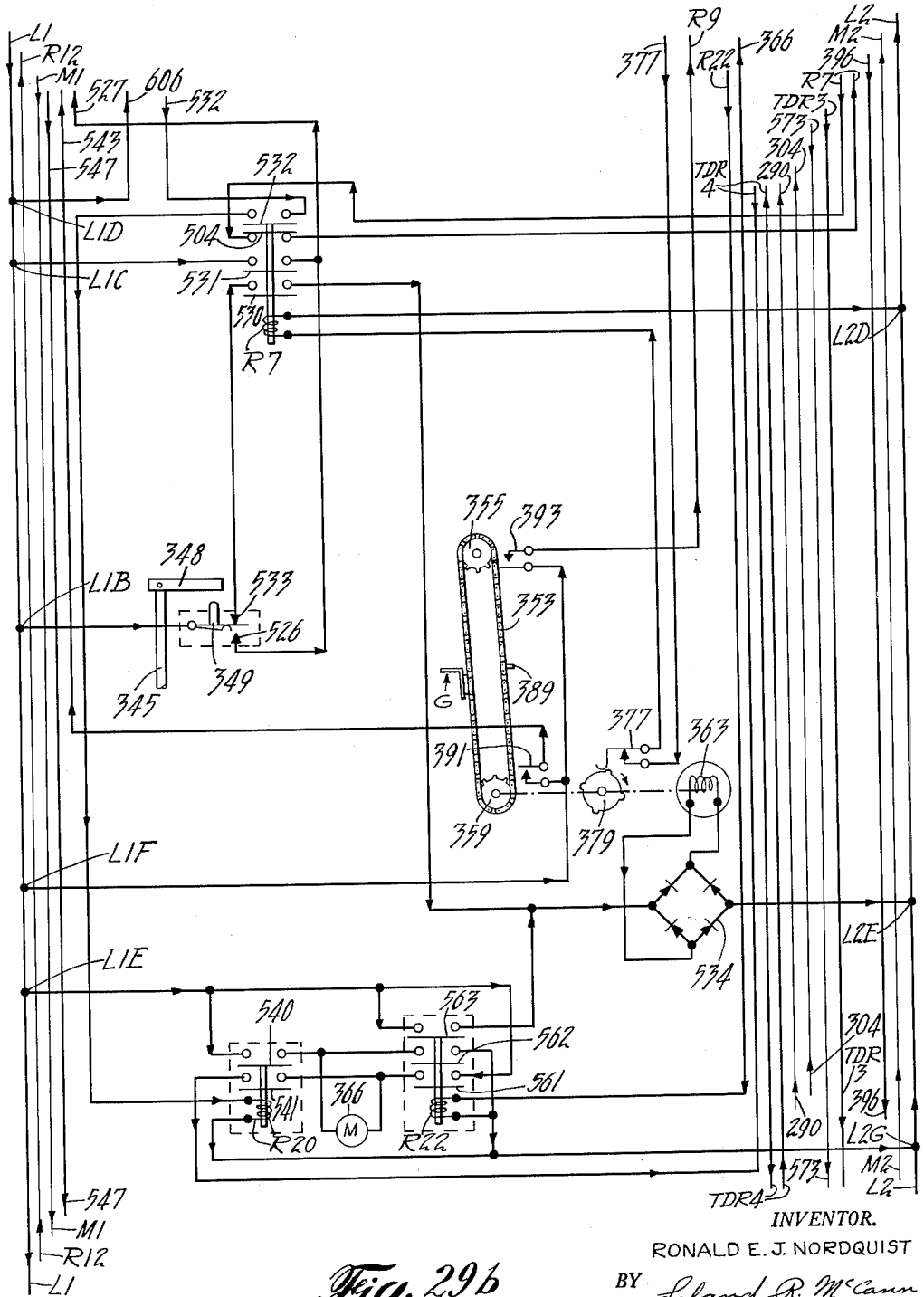

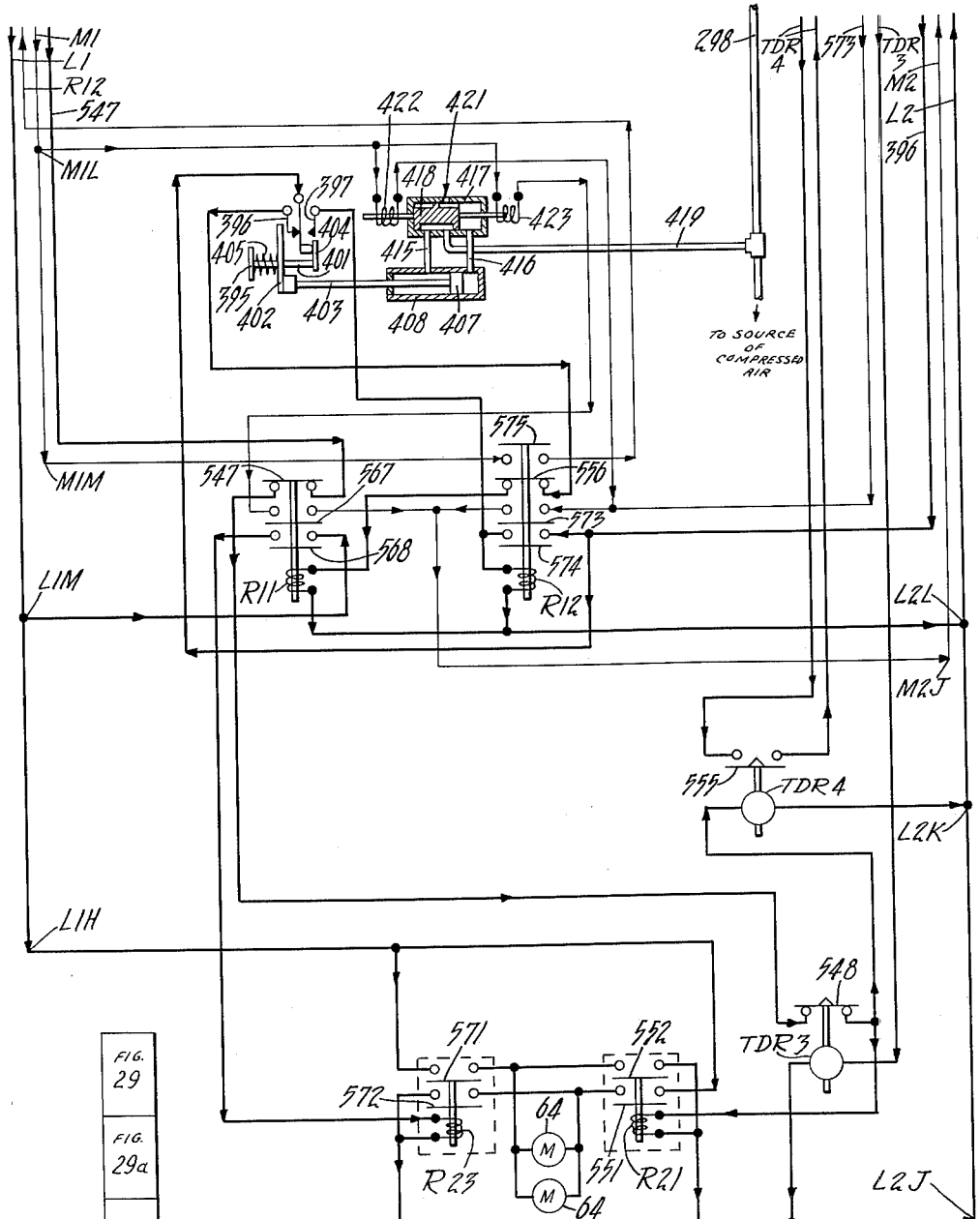

United States Patent Office 2,984,365
Patented May 16, 1961

2,984,365
CAN STACKING APPARATUS
Ronald E. J. Nordquist, Summit, N.J., assignor to American Can Company, New York, N.Y., a corporation of New Jersey
Filed Dec. 19, 1957, Ser. No. 703,815
14 Claims. (Cl. 214—6)

The present invention relates to an apparatus for stacking cans or containers into freight cars or other compartments or bins or restricted spaces for shipment or storage and has particular reference to a portable automatic apparatus for assembling the cans or containers in single row formation and for placing each row individually in the car or compartment to produce an orderly arranged solid stack.

An object of the instant invention is the provision of an apparatus for stacking cans or containers automatically row-by-row, vertically one on top of the other to form tiers and horizontally one in front of the other to produce layers which, combined, result in solid stable stacks which will withstand transportation in a moving vehicle.

Another object is the provision of such an apparatus which is adapted to deliver or stack full rows of cans, the full width of the car or compartment and still have the apparatus clear the sides of the car or compartment for proper manipulation.

Another object is the provision of such an apparatus which stacks the rows of cans in such a manner as to lock their flanges and end seams behind the flanges and end seams of the adjacent row so as to provide for stability of the tiers of cans.

Another object is the provision of such an apparatus which stacks the cans in single tiers to facilitate and expedite the building up of the solid stack.

Another object is the provision of such an apparatus which effects a substantially continuous flow of cans therethrough to expedite the loading of cars or compartments.

Another object is the provision of such an apparatus which is fully automatic.

Another object is the provision of such an apparatus which staggers the cans in alternate rows in each tier so that the cans in one row nest in the valleys between the cans in an adjacent row.

Numerous other objects and advantages of the invention will be apparent as it is better understood from the following description, which, taken in connection with the accompanying drawings, discloses a preferred embodiment thereof.

Referring to the drawings:

Fig. 4 is an enlarged top plan view of a can turning device used in the apparatus, the view being taken substantially along the line 4—4 in Fig. 1, parts being broken away;

Figs. 5 and 6 are sectional views taken substantially along the broken lines 5—5, 6—6 in Fig. 4, with parts broken away;

Fig. 8 is an enlarged side elevational view of the entrance end of a can row assembling tray shown in the mid-portion of Fig. 1 at the right, parts being broken away and parts in section:

Figs. 9 and 10 are sectional views taken substantially along the lines 9—9, 10—10 in Fig. 8;

Fig. 11 is an enlarged top plan view of a stop mechanism in the assembling tray, the view being taken substantially along the line 11—11 in Fig. 1, parts being broken away;

Fig. 12 is a side elevation of the stop mechanism shown in Fig. 11, with parts broken away;

Fig. 13 is a sectional view taken substantially along the broken line 13—13 in Fig. 11, parts broken away;

Fig. 14 is a side elevation of a mid-portion of the can row assembling tray and forms a continuation of the tray shown in Fig. 8, parts being broken away;

Figs. 15 and 16 are sectional details taken substantially along the lines 15—15, 16—16 in Fig. 14, certain of the parts being shown in different dot and dash line positions;

Fig. 17 is a side elevation of a continuing portion of the can row assembling tray shown in Figs. 8 and 14, parts being broken away;

Fig. 18 is a sectional view taken substantially along the broken line 18—18 in Fig. 17;

Fig. 19 is a view similar to Fig. 18 showing certain of the parts in a different position;

Figs. 20, 21, 22 are enlarged sectional views of a can row placing device, the views being taken substantially along the line 20—20 in Fig. 1 and showing different positions of certain of the parts during different stages of the can row placing operation, parts being broken away;

Fig. 23 is an enlarged part sectional and part elevational view of the apparatus driving mechanism shown in the center lower portion of Fig. 1;

Figs. 24 and 25 are sectional views taken substantially along the lines 24—24, 25—25 in Fig. 23;

Fig. 26 is an enlarged top plan view of a can row feeler device, the view being taken substantially along the line 26—26 in Fig. 2, parts being broken away;

Fig. 27 is a side elevation of the device shown in Fig. 26;

Fig. 28 is a fragmentary sectional view similar to Fig. 27 and showing certain of the parts in a different position;

Figs. 29, 29A, 29B, 29C, 29D are wiring diagrams and when arranged end to end in numerical order illustrate the entire wiring diagram of the electric apparatus used in the apparatus, the figures also showing principal parts of the apparatus and a fluid pressure system for operating them.

Fig. 30 is a schematic plan view showing how the sheets of drawings containing Figs. 29 to 29D inclusive of the wiring diagram, are fitted together to show the entire diagram.

As a preferred and exemplary embodiment of the instant invention the drawings disclose an apparatus for loading empty cylindrical sheet metal cans or containers A (Fig. 1) into freight cars B and other compartments of comparable dimensions in orderly stacked formation.

The cans A are received from any siutable source of supply, such as from storage bins in a warehouse or direct from can making machines in a factory and are conveyed to the loading platform through a system of can elevators and runways which permit the cans to roll on their sides in a substantially continuous procession.

Figure 6:
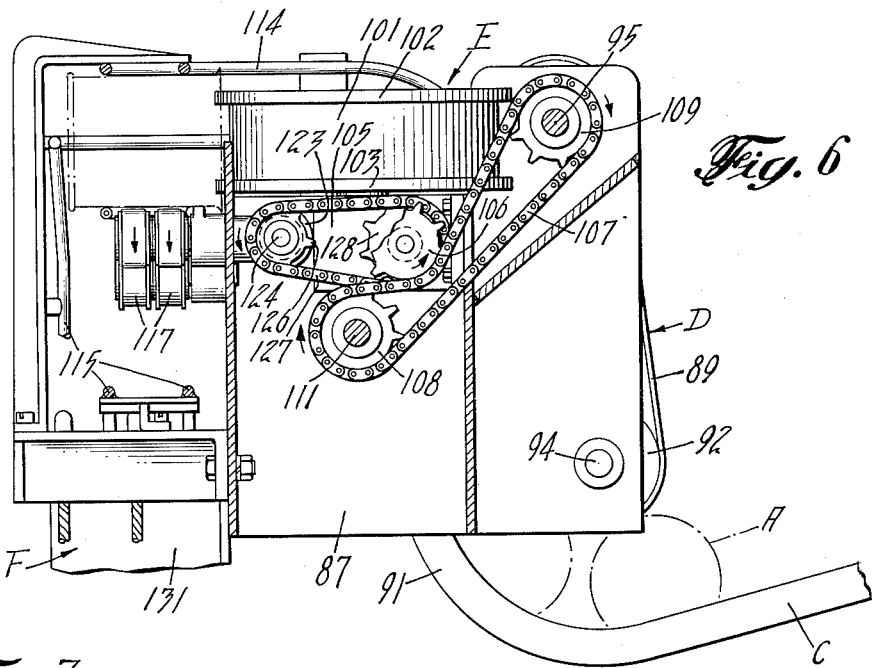

In such an apparatus, the rolling cans A are received from the can conveyor system, through an inclined runway C (Figs. 1, 2 and 6) which extends along one side of the car B and which is arranged to support the cans and guide them into the grip of a short vertically disposed belt elevator D which carries them up toward the ceiling of the car B. The elevator D delivers the cans to a magnetic turning device E (see also Figs. 4, 5, 6 and 7) which swings the cans horizontally through an angle of 90 degrees and discharges them into a vertical chute F which preferably at all times (except initially) is kept full so that the cans are prevented from falling through any great distance. The chute F is automatically adjustable for height and its lower end is attached to a vertically movable, horizontally disposed tray G into which the chute F delivers the cans in a substantially continuous single line or row procession. This tray G extends transversely of the car B in front of the stack to be formed in the car and like all of the other devices of the loading apparatus is supported on a movable frame H.

The tray G is a fully enclosed multi-member device having a horizontally movable bottom wall and integral partial back wall constituting a can supporting shelf, a horizontally movable top wall and integral partial back wall constituting a holding element and a vertically movable front wall constituting a gate.

Loading of a car B preferably begins at the ends of the car, each end being loaded separately, and working toward the middle of the car where the exit door is located. Hence when the tray G is filled with cans A, a stop device J (Fig. 1) located adjacent the entrance end of the tray operates to cut off the cans in the chute F from the cans in the tray and the tray then moves horizontally toward the end of the car B, and lays the first row on the car floor, the tray being located near the floor. This deposit of the row of cans A on the car floor is brought about by the gate first being raised to clear the cans in the tray, the entire tray then being moved forward into can row locating position, a withdrawal of the can supporting shelf while the holding element remains in position to prevent the retraction of the cans with the shelf, and then a final retraction of the holding element and a closing of the gate for a subsequent row.

When the tray G is reloaded with a second row of cans A, it is automatically raised the height of one row of cans and then moved forward into position above the previously deposited row to deposit or stack this second row on top of the first row in the same manner as described above for the first row. In this manner, through repeated operations, each time elevating the tray a distance substantially equal to the height of one row of cans, a tier of cans is built up from the floor of the car B to its ceiling.

Each time a row is added to the tier provision is made for staggering the cans through a can staggering device K located at the far end of the tray. This may be effected in one of two ways; in a preferred manner as shown by shifting the rows longitudinlly one half a can space so that each row has an equal number of cans or in an alternate manner by the subtraction of one can from alternate rows to produce short and long rows of cans. As each row is placed in a tier, the cans in the upper row are set back of the cans in a lower row to provide for stability of the tier. An inclined backboard L (Fig. 2) preferably is placed in the end of the car before loading to serve as a support for the first tier of cans.

When one tier of cans A is completed, the tray G which now is at the top of the apparatus, i.e. near the ceiling of the car, is lowered to the floor and the entire apparatus moved back the width of one row of cans so that another tier of cans may be built up in front of the previously formed tier. In this manner, the continued or repeated building up of tiers of cans in the car, results in a solid stack which fills the end of the car and is sufficiently stable to withstand transportation therein.

Referring now in more detail to the drawings, the frame H on which the various devices of the apparatus are supported, preferably comprises a structure made of pipe or tubular elements in which there is provided a pair of spaced and parallel upright members 51, 52 (Figs. 1 and 2) connected by transverse tie members 53, 54 and extending up from a flat base 55 and supported by diagonally disposed braces 56. The upright members 51, 52 preferably incline toward the end of the car or compartment B at an angle of substantially two degrees for the purpose of offsetting each row of cans A as it is placed on the stack to lock the end seams and flanges of the cans to produce stability of the tiers of cans as hereinbefore mentioned.

The frame H is mounted on forward supporting wheels 57 and rearward propelling wheels 58 which are attached to the base 55. The propelling wheels 58 are mounted on shafts 59 which carry gears 61 which mesh with gears 62 of a pair of conventional speed reduction units 63 actuated at the proper time by electric motors 64 to propel the apparatus into loading position within the car B and to repeatedly move the apparatus back one can row space during the building up of the stack of cans in the car.

After each backward movement of the apparatus, the frame H is clamped against displacement for the duration of the building up of one tier of cans, by a pair of clamping elements 66 (Figs. 1 and 2) which are thrust outwardly against the sides of the car B. These clamping elements 66 are mounted on the outer ends of piston rods 67 (see Fig. 29A) having pistons 68 which operate in fluid pressure cylinders 69 carried on the base 55 of the frame H. There is one cylinder 69 on each side of the apparatus.

The pistons 68 in the cylinders 69 are maintained under pressure, by any suitable fluid medium, preferably compressed air. For this purpose the ends of the cylinders 69 are connected by pipes 71, 72 to a conventional slide valve housing 73 having a slide valve 74 which controls the introduction of compressed air into the pipes 71, 72 alternately by communication with a feed pipe 75 connected to the housing 73. The feed pipe 75 connects with a continuing feed pipe 76 which in turn connects with a main feed line 77 (Fig. 29) which leads from any suitable source of air under pressure.

The slide valve 74 also controls the venting of the cylinders 69 by way of the connecting pipes 71, 72, through a vent port 78 in the housing 73. This control by the slide valve 74 is effected through timed reciprocation of the valve in its housing 73. For this purpose the ends of the valve 74 are provided with stems 81, 82 which project beyond the housing and serve as cores for electric solenoids 83, 84 which are alternately energized and deenergized at the proper time by electrical connections illustrated in the wiring diagram to be hereinafter explained.

Figure 1:
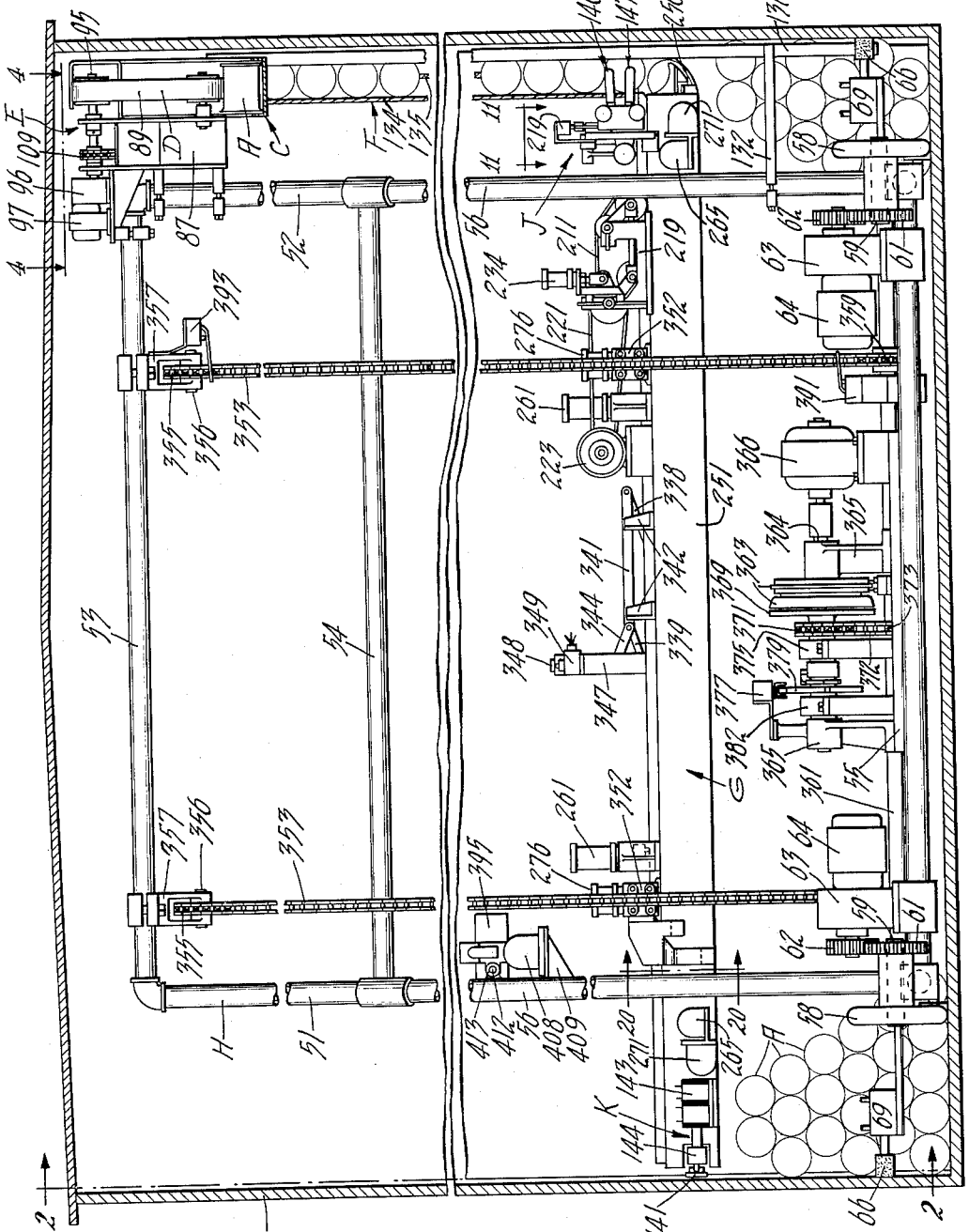
Figure 1 is a sectional view taken transversely of a freight car or other compartment having in place a can stacking apparatus embodying the instant invention, the apparatus being shown in elevation.
Figure 7:
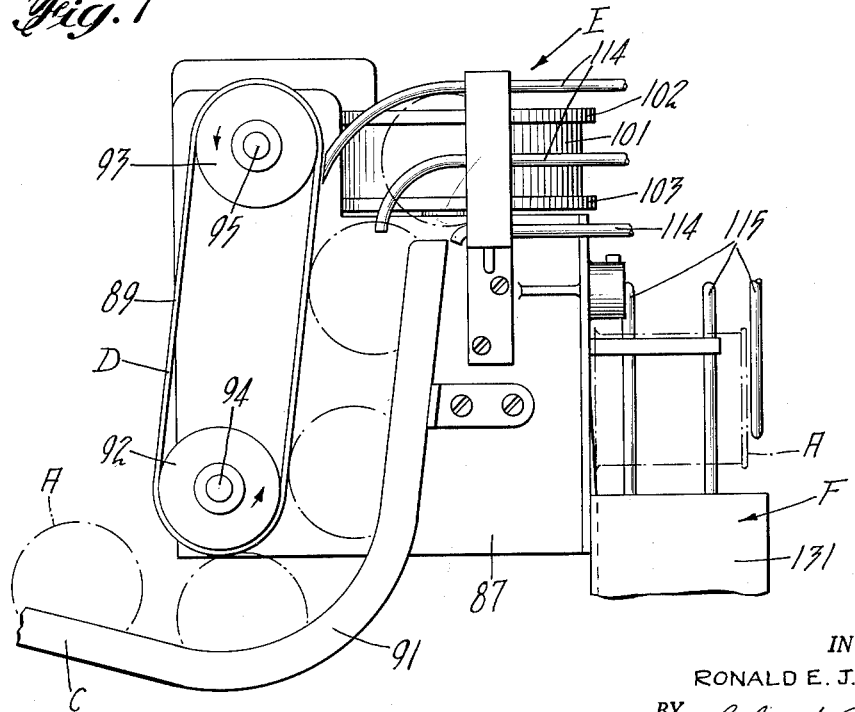
Fig. 7 is a side elevation of the device shown in Fig. 4, the elevation being viewed along the line 7—7 in Fig. 4, parts being broken away.

With the apparatus properly located in the car B and clamped against displacement against the sides of the car, the cans A entering the apparatus are ready to be arranged in rows and the rows placed in the car in orderly fashion to build up a tier of the stack. As hereinbefore mentioned, the cans enter by way of the conveyor C. This conveyor may be of any suitable construction and as shown in the drawings by way of example comprises an inclined channel shaped runway having a bottom wall and side guides (see Fig. 7) which permit of the cans rolling on their sides under the force of gravity. This runway preferably extends along one side wall of the car B as shown in Fig. 1 and connects with a bracket 87 which supports the can elevator D and the can turning device E as shown in Fig. 7. The bracket 87 is located at the top of the frame H adjacent the can entrance side of the apparatus and is clamped to the upright 52 and the top tie bar 53 of the frame.

The elevator D (Figs. 1, 2, 6 and 7) which receives the rolling cans A from the runway C and elevates them into the can turning device E, preferably comprises a continuously moving short endless belt 89 having an inner run disposed in a substantially vertical and spaced and parallel relation to a curved and upright continuing extension 91 of the can entrance runway or conveyor C, so as to draw the rolling cans individually into the space between the inner run of the belt and the runway extension and thereby through frictional engagement cause the cans to roll upwardly along the runway extension 91. The belt 89 operates over a pair of spaced pulleys 92, 93 mounted respectively on an idler shaft 94 and a driving shaft 95 journaled in the bracket 87. The driving shaft 95 is rotated continuously at a proper speed, through a conventional speed reduction unit 96 (Fig. 4) actuated by a continuously operating electric motor 97 (see also Figs. 1 and 2) mounted on the bracket 87.

The can turning device E preferably is a continuously rotating magnetic wheel 101 (Figs. 4, 5, 6 and 7) located adjacent the upper or discharge end of the elevator D with its axis in a vertical position and with its outer periphery substantially tangential to the path of travel of the open ends of the cans A as they are discharged from the elevator D, for the purpose of attracting the cans and holding them by their open ends to bodily turn or swing them through an arc of 90 degrees to change their path of travel from their path longitudinally of the car B to a path of travel transversely of the car. The wheel 101 preferably embodies a permanent magnet having cylindrical upper and lower pole pieces 102, 103.

The can turning wheel 101 is mounted on the upper end of a continuously rotating vertical shaft 104 (Fig. 4) forming a part of a conventional speed reduction unit 105 (see also Fig. 6) attached to the bracket 87. The reduction unit 105 is driven by a sprocket 106 which meshes with an endless chain 107 operating over an idler sprocket 108 and a driving sprocket 109. The sprocket 108 is mounted on a short pin 111 carried in a boss 112 (Figs. 4 and 5) on the bracket 87. The sprocket 109 is mounted on and is driven by the elevator drive shaft 95. Hence the elevator D and the can turning device E are operated in unison in timed relation. Curved guide rails 114 extending around one quadrant of the preiphery of the turning wheel 101, guide the cans A along this path of travel.

Upon completing its quarter turn around the turning wheel 101 a can A is disposed with its axis substantially perpendicular to the end of the car B and its open end facing away from the car end. In this relation, the cans A are stripped off the magnetic wheel 101 and are carried downwardly along a sharply curved path of travel, guided by suitable curved guide rails 115 which substantially are continuations of the guide rails 114 as best shown in Figs. 4 and 5. The guide rails are supported from the bracket 87.

In order to prevent jamming of the cans A during their travel along the sharply curved guide rails 115 a pair of adjacently disposed endless belts 117 are provided to frictionally engage the cans and propel them along their path of travel. The belts operate over a driving pulley 118 located at the center of curvature of the guide rails and over an idler pulley 119 disposed remote from the path of travel of the cans as best shown in Fig. 5. These pulleys are mounted on respective shafts 120, 121 journaled in the bracket 87. The driving shaft 120 is rotated continuously in the proper direction and in time with the elevator D and turning device E, through a bevel gear 122 (Fig. 4) mounted on the inner end of the shaft. The gear 122 meshes with and is driven by a bevel gear 123 mounted on a shaft 124 journaled in a bearing 125 in the bracket 87. The shaft 124 is rotated by a sprocket 126 (Fig. 6) carried thereon and driven by an endless chain 127 which operates over and is driven by a sprocket 128 disposed adjacent the sprocket 106 of the turning device speed reduction unit 105.

Figure 2:
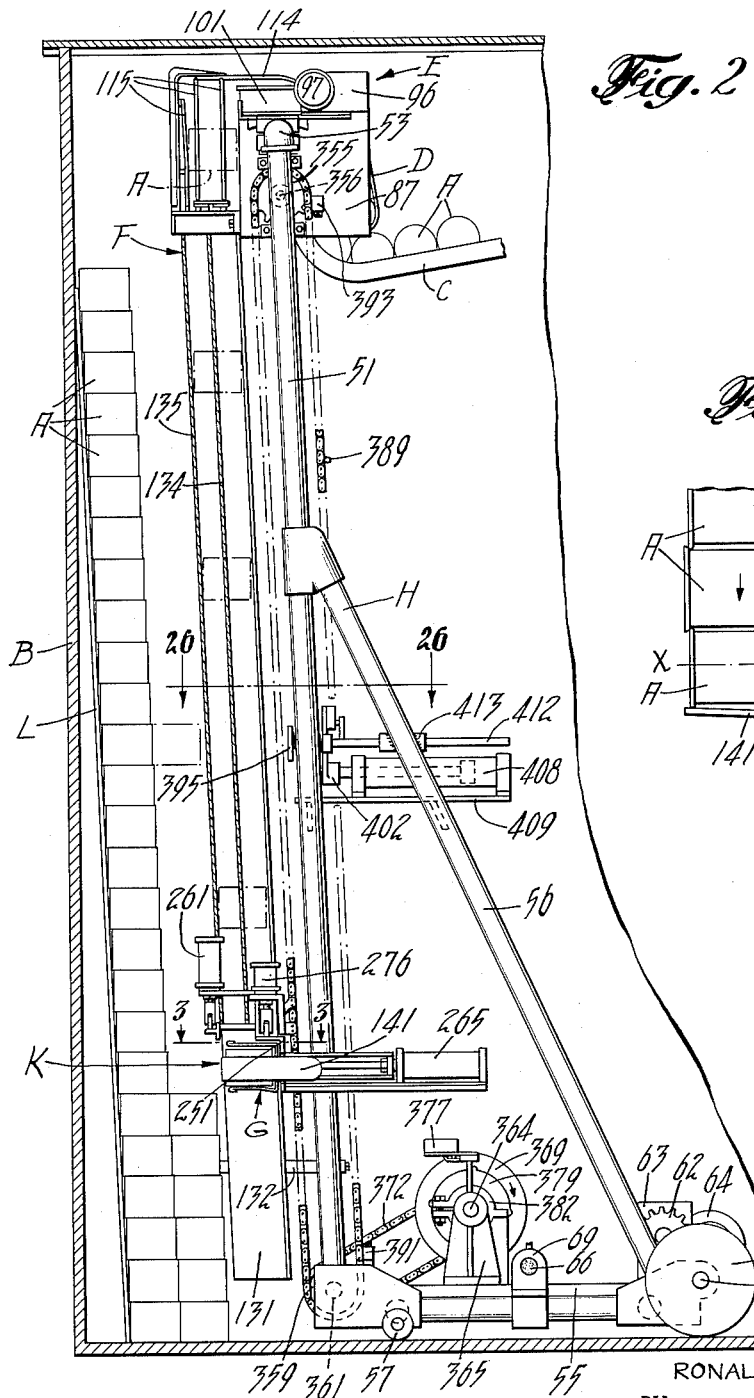
Fig. 2 is a side elevation of the apparatus located in one end of a freight car or compartment, the view being taken substantially along the line 2—2 in Fig. 1, with a portion of the car or compartment broken away.

The sharply curved guide rails 115 terminate adjacent and guide the cans A into the upper end of the can feed chute F as shown in Fig. 5. This chute F is defined partially by a stationary L-shaped guide rail 131 (Figs. 1, 2, 5, 7, 11, 12 and 13) which is disposed in a slightly inclined upright position adjacent the can entrance side wall of the car B and extends for nearly the full height of the car. The upper end of the rail 131 is secured to the bracket 87 as best shown in Figs. 2 and 7. The lower end is secured by a clamp 132 to the frame upright 52 as best shown in Figs. 1 and 2.

The wide leg of the L-shaped rail 131 is disposed adjacent the side of the car B as shown in Figs. 1 and 2, while the short leg extends away from the car side wall at substantially right angles thereto so as to leave one side and the front (facing the end of the car) open. These legs of the rail provide rigid rolling and guiding ledges in the chute F for the cans. The two open sides of the chute F are defined by cables 134, 135 the lower ends of which are attached to the can entrance end of the tray G as shown in Fig. 8. The upper ends of the cables are embodied in conventional spring drum, cable wind-up devices 136, 137 (Fig. 5) which keeps the cables taut. With such an arrangement, the cables 134, 135 are automatically shortened as the tray G moves up along the stationary rail 131 with the building up of a tier of cans and hence the chute F is automatically adjusted for length to properly guide the cans A into the tray G.

Figure 3:
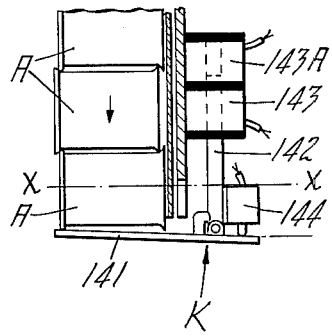
Fig. 3 is an enlarged fragmentary sectional detail taken substantially along the line 3—3 in Fig. 2.

As the cans A roll from the vertical chute F into the tray G, they continue their rolling action along the tray to its far end where the leading can engages and is stopped by the can staggering device K (Figs. 1, 2 and 3). This causes the cans to back up in the tray until the tray is filled with a single solid row of cans, with excess cans in the procession backing up in the chute F to keep the chute filled as hereinbefore mentioned.

The can staggering device K preferably comprises a stop lever 141 (Figs. 2 and 3) which is located at the terminal end of the tray G and which extends into the path of travel of the cans rolling in the tray. Intermediate its ends and beyond the tray, the lever 141 is pivotally connected to a movable solenoid core 142 which extends through a pair of opposed electric solenoids 143, 143A attached to the back of the tray G. Beyond the pivotal mounting the lever 141 engages against or is contiguous to a normally open electric switch 144.

In operation, the electric solenoids 143, 143A are energized alternately through a stepping relay for the rows of cans assembled in the tray G for the purpose of shifting the core 142 and the stop lever 141 along the tray G in opposite directions a distance substantially equal to one half the diameter of a can so that for one row the stop lever 141 will stop the leading can at the point shown in Fig. 3 and for the next row will stop the leading can one half diameter less, at the line X—X in Fig. 3. In this manner the second row is shifted one half can diameter relative to the first row, or if desired is made one can shorter than the first row so that when the second row is stacked on top of the first row in a tier, the upper or second row will nest in staggered relation in the valleys of the cans in the lower row and thus produce a stable tier. This shifting of the can stop lever 141 is effected in time with the assembling and stacking of the rows of cans.

When the tray G has received a complete solid row of cans to be stacked, the pressure of the cans against the stop lever 141 rocks the latter on its pivoted mounting and thereby closes the electric switch 144. The closing of this switch 144, through a series of relays to be hereinafter explained, actuates the can stop device J (Figs. 1, 11, 12, 13), located at the entrance end of the tray G, to hold back the column of cans A in the chute F and to lift the entire column just sufficient to position the lowermost can in the column clear of the last can in the tray to provide for the proper stacking operation of the tray.

The can stop device J is provided with two horizontally disposed stop pins 146, 147 (Figs. 11, 12 and 13) located one above the other adjacent the lower end of the feed chute F. These pins are normally held in a retracted position away from the path of travel of the cans through the chute. The upper stop pin 146 is projectable into the lowermost can in the chute, as shown in Figs. 12, and 13 to segregate the column of cans in the chute from a full row of cans in the tray as when the can staggering device stop lever 141 is in the position shown in Fig. 3. In a similar manner, the lower stop pin 147 is projectable into the lowermost can in the chute as shown in dotted line in Fig. 13, to segregate the cans in the chute for the alternate full row in the tray, as when the can staggering device stop lever 141 stops the leading can in the tray at the line X—X in Fig. 3. These stop pins 146, 147 are operated alternately in unison with the operation of the staggering device stop lever 141.

In this stop device J, the two stop pins 146, 147 are mounted on separate arms 148, 149 which project laterally from a pair of parallel slides 151, 152 carried on a horizontally disposed slide bar 153. The slide bar 153 is integral with a vertical movable plate 154 having a vertical T-shaped slide 155 which operates in a vertical slideway 156 of a support bracket 157 secured to and extending from the tray G.

The stop pins 146, 147 are projected into the cans A and are retracted at the proper time, through the timed operation of fluid pressure devices which are similar to the frame clamping devices. For this purpose the stop pin slides 151, 152 are connected to separate piston rods 161, 162 (Figs. 11, 12, 13 and 29) having pistons 163, 164 which operate in separate fluid pressure cylinders 165, 166 supported on the vertically movable plate 154 and are hence movable with the plate.

There is one cylinder for each stop pin 146, 147 and these cylinders 165, 166 are maintained under pressure of the compressed air pressure medium. For this purpose the ends of the cylinder 165 for the upper stop pin 146 are connected by pipes 168, 169 to a conventional slide valve housing 171 having a slide valve 172 which controls the introduction of compressed air into the pipes 168, 169 alternately, by communication with a feed pipe 173 connected to the housing 171. The feed pipe 173 connects with a continuing feed pipe 174 which leads from any suitable source of air under pressure. The slide valve 172 also controls the venting of the cylinder 165 by way of the connecting pipes 168, 169, through a vent port 175 in the housing 171.

This control by the slide valve 172 is effected through timed reciprocation of the valve in its housing 171. For this purpose the ends of the valve 172 are provided with stems 176, 177 which project beyond the housing 171 and serve as cores for electric solenoids 178, 179 which are alternately energized and deenergized at the proper time through an electric switch 180 (Fig. 13) which is actuated by both of the pin slides 151, 152 and which is included in the electrical connections illustrated in the wiring diagram to be hereinafter explained.

In a similar manner the ends of the cylinder 166 for the lower stop pin 147 are connected by pipes 181, 182 to a conventional slide valve housing 183 having a slide valve 184 which controls the introduction of compressed air into the pipes 181, 182 alternately by communication with a feed pipe 185 connected to the housing 183 and to the main feed pipe 174. The slide valve 184 also controls the venting of the cylinder 166 by way of the connecting pipes 181, 182, through a vent port 186 in the housing 183.

This control by the slide valve 184, like the slide valve 172, is effected through timed reciprocation of the valve in its housing 183. For this purpose the ends of the valve 184 are provided with stems 187, 188 which extend beyond the housing 183 and serve as cores for electric solenoids 189, 190 which are alternately energized and deenergized at the proper time by the electric switch 180A included in the electrical connections illustrated in the wiring diagram to be hereinafter explained.

The vertical movement of the plate 154 which carries the stop pins 146, 147, to raise the column of cans A in the vertical chute F to relieve pressure on the row of cans assembled in the tray G, is effected through an air pressure device similar to those just described. For this purpose the upper end of the vertical slide 155 (Figs. 11, 12, 13) of the pin carrying plate 154, is connected to a substantially horizontal arm of a bell crank lever 193 pivotally mounted on the staggering device bracket 157 attached to the tray G, the lever 193 being shown in Fig. 29 in reverse order for convenience in illustration. The lower end of the substantially vertical arm of the bell crank lever 193 is connected to a piston rod 194 having a piston 195 which operates in an air cylinder 196 attached to the bracket 157.

The ends of the cylinder 196 are connected by pipes 197, 198 to a conventional slide valve housing 201 having a slide valve 202 which controls the introduction of compressed air into the pipes 197, 198 alternately, by communication with a feed pipe 203 connected to the housing 201 and to the feed pipe 173 as shown in Fig. 29. The slide valve 202 also controls the venting of the cylinder 196 by way of the connecting pipes 197, 198, through a vent port 204 in the housing 201.

Like the slide valves 172, 184, the control of the slide valve 202 is effected through timed reciprocation of the valve in its housing 201. For this purpose the ends of the valve 202 are provided with stems which project beyond the housing 201 and serve as cores for electric solenoids 207, 208 which are alternately energized and deenergized at the proper time by electrical connections illustrated in the wiring diagram to be hereinafter explained.

Operating in time with the staggering device J is a can propelling device which is disposed adjacent the staggering device on the tray G and which continuously comprises a continuously moving endless belt 211 (Fig. 8) the lower run of which extends along the path of travel of the cans A in the tray G and which is raised and lowered in time with the projection and retraction of the stop pins 146, 147 into and out of the cans in the chute F, to feed the cans A along the tray G to insure the assembly of a solid row.

The belt 211 (Figs. 8 and 10) operates over a series of four pulleys, a driving pulley 212, an idler pulley 213 and two pressure pulleys 214, 215, arranged in parallelogram order. The driving pulley 212 is mounted on a shaft 217 journaled in a pair of spaced bearings 218 formed in a sub-frame 219 attached to the tray G. This shaft 217 is driven continuously in the proper direction shown by the arrows in Fig. 8, by an endless belt 221 which operates over a pulley 222 on the shaft 217 and over a pulley (not shown) on a continuously operating electric motor 223 (see Fig. 14) on the tray G.

The idler pulley 213 (Fig. 8) is disposed at substantially the same level as the driving pulley 212 and is mounted on a shaft 225 journaled in a pair of spaced bearings 226, similar to the bearings 218, formed in the sub-frame 219.

The two pressure pulleys 214, 215 (Figs. 8 and 10) are disposed at a level below the pulleys 212, 213 and are mounted on two separate short shafts 226, 227 carried in the lower ends of two separate angularly disposed parallelogram arms 228, 229 freely mounted on and depending from the driving shaft 217 and the idler shaft 225. The lower ends of the parallelogram arms 228, 229 are connected together, by a tie rod 231, for movement in unison and to retain the arms in parallel relation.

Through a periodic rocking movement of the parallelogram arms 228, 229 the lower run of the belt 211, between the pressure pulleys 214, 215, is lowered into frictional engagement with the cans A rolling along the tray G to advance the cans beyond the belt, toward the far end of the tray G so as to insure contact of the leading can with the stop lever 141 at the end of the tray and to thereby insure a full, solid row of cans in the tray. When the tray is full and the stop lever 141 is actuated to set the stop pins 146, 147 in motion to stop the flow of cans into the tray, the lower run of the belt 211 is lifted away from the cans in the tray to relieve the advancing pressure on the cans.

This raising and lowering of the lower run of the belt 211 is effected through operation of an air cylinder 234 (Figs. 8 and 10) which houses a piston 235 (see also Fig. 29) having a piston rod 236 connected to an arm 237 which is integral with the parallelogram arm 229 as in a bell crank. The ends of the cylinder 234 are connected by pipes 238, 239 to a conventional slide valve housing 241 having a slide valve 242 which controls the introduction of compressed air into the pipes 238, 239 and hence into the ends of the cylinder 234, alternately, by communication with a feed pipe 243 connected to the housing 241. The feed pipe 243 leads to a suitable source of air under pressure. The slide valve 242 also controls the venting of the cylinder 234 by way of the pipes 238, 239, through a vent port 244 in the housing 241.

This control of the slide valve 242 is effected through timed reciprocation of the valve in its housing 241. For this purpose the ends of the valve 242 are provided with stems which project beyond the housing and serve as cores for surrounding electric solenoids 245, 246 which are alternately energized and deenergized at the proper time by electrical connections illustrated in the wiring diagram to be hereinafter explained.

As herebefore mentioned the tray G is a fully enclosed horizontal multi-member device which extends nearly the full width of the freight car B. This tray G comprises a horizontally disposed inverted L-shaped support member 251 (Figs. 1, 8, 9, 10, 14 and 17) which supports all of the devices which travel with the tray, an inverted L-shaped can holding element 252 which is disposed directly under the support member 251 and extends for its full length but is movable horizontally thereof, a horizontally movable L-shaped can supporting shelf 253 which extends the full length of the tray in vertically spaced relation below the holding element 252 for supporting the row of cans in the tray, and a vertically movable T-shaped gate 254 which also extends the full length of the tray and is normally disposed in front of the holding element 252 as best shown in Fig. 19 to close the only open side of the tray and thus retain the row of cans in place in the tray until ready for stacking.

At the entrance end of the tray G, i.e. the end adjacent the feed chute F (see Fig. 13), the can supporting shelf 253 is provided with an upwardly curved bottom guide plate 256 which extends into the chute F and which guides the cans from the chute into the tray. When the tray is filled with a complete or solid row of cans to be stacked, the last can in the row rests on the curved guide plate 256 in a slightly elevated relation to the other cans in the row, as best shown in Fig. 13, so that when the row is placed in the stack, this last elevated can will move down in line with the others, but by so doing also moves laterally to fill the space adjacent the side of the freight car B. At the same end of the tray G, the vertical wall of the upper or holding element 252 is extended to provide a side guide 257 (Fig. 13) to guide the cans entering the tray and to subsequently hold them in position when stacked as will be hereinafter explained.

In order to provide for easy rolling of the cans A along the can supporting shelf 253 during the assembling of a solid row of cans thereon, the vertical back wall section of the L-shaped shelf is formed with a longitudinally extending convexly shaped guide rail section 258 (Fig. 10) which projects into the tray and which presents a minimum surface to the open ends of the cans to reduce the frictional engagement with the cans. Directly below this guide rail section 258, the bottom or horizontal wall section of the L-shaped shelf 253 is formed with a downwardly tapering section 259 which provides a clearance recess along its inner edge for the flanges on the open ends of the cans, as shown in Fig. 10.

When a row of cans A has been assembled in the tray G, the gate 254 is raised from the position shown in Fig. 19 to the position shown in Figs. 18 and 20. This action leaves the front of the tray open with the closed ends of the cans exposed and unguided as shown in Fig. 18. Movement of the gate 254 preferably is effected through a pair of spaced air cylinders 261 (Figs. 1, 14, 16, 20) having pistons 262 (Fig. 29A) on piston rods 263 which are connected to the gate.

When the gate 254 is clear of the tray G, the can holding element 252 and the can supporting shelf 253 are moved forward simultaneously, toward the inclined backboard L in the end of the car B to position the row of cans carried on the shelf for stacking, as best shown in Fig. 21. This movement of the holding element 252 preferably is effected through a pair of air cylinders 265 (Figs. 1, 8, 9, 20, 29C) having pistons 266 on horizontally disposed piston rods 267 extending through slots 268 (Fig. 13) in the tray support member 251 and connected to the vertical back wall section of the holding element 252. In a similar manner the movement of the can supporting shelf 253 preferably is effected through a pair of air cylinders 271 having pistons 272 on horizontally disposed piston rods 273 extending through slots 274 (Fig. 13) in the tray support member 251 and connected to the vertical back wall section of the can supporting shelf 253.

The tray G, during the assembling of a row of cans therein, is located at a predetermined level above the top row in the tier or above the floor of the car B when starting a new tier, to insure proper clearance above the cans or floor, and when the tray shelf 253 is moved forward to place the row of cans, it is moved at this same level until the row of cans is substantially over the place it is to be deposited. Near the end of this forward movement, the holding element 252 and the support shelf 253 are lowered close to the top row of cans in the tier or the floor so as to minimize the distance the row of cans will drop when released. This lowering movement preferably is effected through a pair of vertically disposed air cylinders 276 (Figs. 1, 2, 15, 20, 21, 22, 29C) having pistons 277 on piston rods 278 connected to the top wall section of the inverted L-shaped tray support member 251.

When the row of cans A on the shelf 253 are in proper position over the top row in the tier or on the floor, the shelf 253 is withdrawn and moves back to its original position while the holding element 252 remains stationary. This action holds the cans in place while the shelf moves out from under them, and thus allows the cans to drop gently into proper place on the tier or the floor, as best shown in Fig. 22. Following this, the holding element 251 is drawn back to its original position in the tray G. The holding element 251 and the shelf 252 are then elevated to their original positions, as before their projection toward the tier. The gate 254 is then closed down into its original position in readiness for the assembly of the next row of cans to be added to the tier.

The pair of air cylinders 261 for operating the gate 254 are connected together at their ends by pipes 281, 282 (Fig. 29A) which in turn are connected by pipes 283, 284 to a conventional slide valve housing 285 having a reciprocable slide valve 286 which controls the introduction of compressed air into the pipes 283, 284 alternately by communication with a feed pipe 287 connected to the housing 285 and to the pipe 76 which leads to the source of compressed air. The slide valve 286 also controls the venting of the cylinders 261 by way of the connecting pipes 281, 282, 283, 284 through a vent port 288 in the housing 285. Reciprocation of the slide valve 286 in its housing 285 preferably is effected by a pair of electric solenoids 289, 290 which surround core stems which extend from the ends of the valve. The solenoids 289, 290 are energized and deenergized alternately at the proper time by the actuation of an electric switch 291 (Fig. 13) operable by the vertical movement of the stop pin device J (Figs. 11, 12, 13) and by a switch 292 (Fig. 20) operable by horizontal movement of the holding element piston rod 267. These switches 291, 292 are included in electrical connections illustrated in the wiring diagram to be hereinafter explained.

In a similar manner the two air cylinders 265 (Fig. 29C) which shift the can holding element 252 are each connected at their ends by pipes 293, 294 to a conventional slide valve housing 295 having a reciprocable slide valve 296 which controls the introduction of compressed air into the pipes 293, 294 alternately by communication with a feed pipe 297 which connects with a main feed pipe 298 leading from a suitable source of air under pressure. The slide valve 296 also controls the venting of the cylinders 265 by way of the connecting pipes 293, 294 through a vent port 299 in the housing 295. Reciprocation of the slide valve 296 in its housing 295 preferably is effected by a pair of electric solenoids 301, 302 which surround core stems which extend from the ends of the valve. The solenoids 301, 302 are energized and deenergized alternately at the proper time through an electric switch 304 (Fig. 20) operated by the gate 254 and by an electric switch 305 (Fig. 20) actuated by the shelf 253 at the termination of its return movement, the switches 304, 305 being included in electrical connections illustrated in the wiring diagram to be hereinafter explained.

The two air cylinders 271 (Fig. 29C) which shift the can support shelf 253 are each connected at their ends by pipes 308, 309 to a conventional slide valve housing 311 having a reciprocable slide valve 312 which controls the introduction of compressed air into the pipes 308, 309 alternately by communication with a feed pipe 313 which connects with the main feed pipe 298. The slide valve 312 also controls the venting of the cylinders 271 by way of the connecting pipes 308, 309 through a vent port 314 in the housing 311. Reciprocation of the slide valve 312 in its housing 311 preferably is effected by a pair of electric solenoids 315, 316 which surround core stems which extend from the ends of the valves. The solenoids 315, 316 are energized and deenergized alternately at the proper time through the electric switch 304 (Fig. 20) operated by the gate 254 and by an electric switch 317 (Figs. 20, 21, 22, 29C) actuated by the tray support member 251 when it is moved down to locate the row of cans for deposit on the tier. These switches 304, 317 are included in the electrical connections illustrated in the wiring diagram to be hereinafter explained.

The two air cylinders 276 (Fig. 20) which raise and lower the entire tray, through the tray support member 251 to locate the row of cans at the proper level for delivery to the tier, are connected together at their ends by pipes 321, 322 (Fig. 29C) which in turn are connected by pipes 323, 324 to a conventional slide valve housing 325 having a reciprocable slide valve 326 which controls the introduction of compressed air into the pipes 323, 324 alternately by communication with a feed pipe 327 connected to the housing 325 and which leads into the main feed pipe 298. The slide valve 326 also controls the venting of the cylinders 276 by way of a vent port 328 in the housing 325.

Reciprocation of the slide valve 326 in its housing 325 preferably is effected by a pair of electric solenoids 331, 332 which surround core stems which extend from the ends of the valve. The solenoids 331, 332 are energized and deenergized alternately at the proper time through actuation of the switch 305 and electric switch 333 (Figs. 20, 21, 22) by a lug 334 on the can holding element piston rod 267, on the can row placing stroke of the rods as explained above. The lug 334 also actuates the switch 292 hereinbefore mentioned. The switch 333 is included in the electrical connections illustrated in the wiring diagram to be hereinafter explained.

The gate 254 (Figs. 17, 18, 19) supports a feeler device which when the gate closes i.e. moves down, after a row stacking operation, lowers the feeler device into contact with the top row of cans in the tier to set in motion elevator devices which lift the entire tray G, one can diameter to relocate the tray for the next row stacking operation. This feeler device preferably comprises a plurality of parallelogram links including a substantially horizontal feeler link 337 connected at its ends to two vertically inclined swing links 338, 339 the upper ends of which are pivotally attached to a stationary horizontal bar 341 secured by spaced brackets 342 to the top of the tray support member 251. The feeler link 337 is located in vertical alignment with the tier of cans being built up but is normally spaced above the top row in the tier. The swing link 339 is attached to an actuating arm 344, the outer end of which is connected through a slot and pin connection, to a vertical rod 345 freely carried in a pair of vertically spaced brackets 346, 347. Bracket 346 is secured to one of the brackets 342, while bracket 347 extends up from the gate 254. The upper end of the rod 345 carries a block 348 which normally engages against and is supported by a normally open electric switch 349 attached to the gate bracket 254. Thus the switch 349 supports and is held open by the entire feeler device as shown in Fig. 18.

When the gate 254 moves down into its original position to close the tray G for the assembly of a new row of cans therein for stacking on the tier being built up, the block 348 follows down with the switch 349 attached to the gate bracket 347 and thus lets the rod 345 move down under its own weight. The descent of the rod 345 swings the parallelogram links 337, 338, 339 down until the feeler link 337 engages the cans in the top row of the tier as shown in Fig. 19. This arrests further downward movement of the feeler link 337 and the rod 345 and thus permits the electric switch 349 in its continued descent with the gate 254, to move away from the block 348. This immediately closes the switch 349 and thus sets in motion the devices which elevate the entire tray G, a distance equal to one can diameter as mentioned above.

In order to provide for this elevation of the tray G, the tray support member 251 through its air cylinders 276 is connected by brackets 352 (Figs. 14, 15, 20) to the outer runs of a pair of vertically disposed endless chains 353 which preferably are inclined to parallel the back board L against which the tiers of cans are stacked. At their upper ends, the chains or conveyors 353 operate over idler sprockets 355 (Figs. 1 and 2) mounted on short shafts 356 journaled in brackets 357 clamped to the top horizontal bar 53 of the main frame H. At their lower ends, the chains 353 operate over actuating sprockets 359 mounted on a long common shaft 361 journaled in bearings in the lower portion of the frame H. Hence through rotation of the shaft 361, the outer runs of the chains 353 are elevated a sufficient distance to raise the tray G into a predetermined position for the next row of cans to be placed on the tier.

Rotation of the conveyor shaft 361 preferably is effected through a magnetic clutch 363 (Figs. 1 and 23) which is mounted on a continuously rotating shaft 364 disposed parallel to the conveyor shaft 361 in spaced relation thereto and journaled in a pair of spaced brackets 365 secured to the base plate 55 of the frame H. The shaft 364 is rotated by an intermittently or periodically operated reversible electric motor 366.

Adjacent the magnetic clutch 363, the motor driven shaft 364 carries a normally stationary long hub 368 which is free on the shaft and which is formed with an integral magnetizable clutch plate 369 and a sprocket 371. The sprocket 371 is connected by an endless chain 372 (Fig. 2) and a suitable sprocket 373 (Fig. 1) to the conveyor shaft 361. A friction brake 375 (see also Fig. 24) around the hub 368 frictionally holds the hub against free rotation with the motor shaft 364.

The magnetic clutch 363 is normally deenergized and is electrically connected to the normally open switch 349 on the gate bracket 347 (Figs. 18 and 19). When the switch 349 closes, upon contact of the feeler device with the top row of cans in the tier being built up, the magnetic clutch 363 is energized and attracts the clutch plate 369 and thus rotates the plate and the sprocket 371 and the hub 368 as a unit and thereby rotates the conveyor shaft 361 to elevate the outer runs of the tray supporting chains 353 as mentioned above.

The rotation of the clutch plate 369 is only a partial rotation, just sufficient to raise the tray the height of one row of cans, and then the rotation is stopped to hold the tray in its elevated position. Stopping of the clutch plate 369 is effected by a deenergization of the magnetic clutch 363. This deenergization of the magnetic clutch 363 is brought about through the opening of a normally closed electric switch 377 (Figs. 2, 23 and 25) which is actuated at the proper time by one of a plurality of spaced lugs 378 formed on the outer periphery of a timing or measuring disc 379 on a short hub 381 loosely mounted on the motor driven shaft 364 adjacent the long clutch plate hub 368. A friction brake 382 (Fig. 23) similar to the brake 375 is used to hold the hub 381 against rotation with the motor driven shaft 364. A ratchet pawl 383 and ratchet wheel 384 is also provided to prevent rotation of the measuring disc 379 in a reverse direction for a purpose to be hereinafter explained. The ratchet wheel 384 is attached to the short hub 381 while the ratchet pawl 383 is mounted on a stationary pin 385 secured in a boss 386 extended laterally from the brake 375.

This completes the operations and apparatus required to assemble and place one row of cans in one tier of the stack to be built up. Through repetitions of these operations, successive rows of cans are assembled individually in the tray G and the tray for each row raised one can row height and the row placed on top of the tier until the tier reaches the top of the freight car B or other compartment as hereinbefore mentioned. When the tray reaches its peak position for the last row in the tier, a lug 389 (Figs. 2 and 29B) on the inner run of one of the tray conveyor chains 353 engages and closes a normally open electric switch 391 located at the bottom of the conveyor.

The closing of the switch 391 energizes an electric relay through which the following series of action takes place. First, the tray elevating motor 366 (Fig. 1) is stopped. Then the air cylinders 69 draw the clamping pads 66 away from the sides of the car B to release the entire apparatus. This is followed by a starting of the apparatus propelling motors 64, in reverse, to propel the apparatus away from the built up tier of cans a distance equal to the depth of the can row plus a considerable clearance space, so as to insure that the row feeler device embodying the parallelogram feeler link 377 is out of register with the built up tier of cans and thus in the clear for the lowering of the tray G. The motors 64 are then stopped and the tray elevating motor 366 is restarted in reverse and the magnetic clutch 363 energized and this lowers the tray G to the floor of the car B in one single continuous sweep.

As the tray nears its lowermost position, the lug 389 (Fig. 2) on the inner run of the conveyor chain 353 engages and closes a normally open electric switch 393 (Figs. 1, 2 and 29B) located at the top of the conveyor. Closing of this switch 393 deenergizes the magnetic clutch 363 and stops the tray elevating motor 366 so as to stop the lowering tray G at the proper place relative to the floor of the car B to properly place the first row of cans in a new tier to be built up. After a short time delay of approximately one and one half seconds, a tier spacing feeler pad 395 (Figs. 1, 2, 26, 29D) is projected forward, toward the already built up tier of cans, a predetermined distance equal to the space the apparatus is to be located for proper operation in building up the new tier. The apparatus propelling motors 64 are then restarted in a forward direction to propel the apparatus toward the built up tier of cans until the feeler pad 395 engages the tier. This engagement immediately opens a normally closed electric switch 396 (Figs. 28 and 29) and closes a normally open electric switch 397 to stop the motors 64 and to actuate the air cylinders 69 to project the clamping pads 66 into engagement with the sides of the car B to hold the apparatus in its located position for the building up of the new tier of cans. The actuation of these switches 396, 397 also energizes electric relays to withdraw the feeler pad 395, to restart the tray elevating motor 366 in its up-tray direction, and through suitable relays to be hereinafter explained, reestablishes the circuits which start the can row assembly and stacking operations effected by the tray G to build up the new tier of cans. Thus row after row and tier after tier of cans A are assembled automatically until the entire end of the car B is filled with cans in orderly stacked and staggered formation.

The row feeler pad 395 preferably is actuated by compressed air. For this purpose the pad 395 is secured to the tier end of a short horizontal stem 401 (Figs. 26, 27, 28, 29D) slideably carried in an arm 402 attached to a horizontal piston rod 403. The opposite end of the stem 401 carries a rigid finger 404 which actuates the switches 396, 397. These switches are connected to the arm 402. Between the arm 402 and the pad 395 a compression spring 405 surrounds the stem 401 to impart yieldability to the pad.

In operation, the spring 405 normally holds the finger 404 against the switch 396 to maintain this switch closed as shown in Figs. 26, 27 and 29D. When the pad 395 is projected into engagement with the tier of cans, the pad stops while the arm 402 continues to move forward and this compresses the spring 405 as shown in Fig. 28 and thus causes the switches to move away from the finger 404. This action opens switch 396 and closes switch 397.

The piston rod 403 carries a piston 407 (Fig. 29D) which operates in an air cylinder 408 supported on a bracket 409 (see Figs. 1, 2, 26) secured to one of the brace members 56 of the frame H. A guide rod 412 connected to the arm 402 and slideably mounted in a long bearing 413 attached to the brace member 56 prevents turning of the feeler pad 395 during its reciprocation with the piston rod 403. The ends of the cylinder 408 are connected by pipes 415, 416 (Fig. 29D) to a conventional slide valve housing 417 having a slide valve 418 which controls the introduction of compressed air into the pipes 415, 416 alternately by communication with a feed pipe 419 connected to the housing 417 and to the main supply pipe 298. The slide valve 418 also controls the venting of the cylinder 408 by way of the connecting pipes 415, 416 through a vent port 421 in the housing 417.

This control by the slide valve 418 is effected through timed reciprocation of the valve in its housing 417. For this purpose the ends of the valve 418 are provided with stems which project beyond the housing and serve as cores for electric solenoids 422, 423 which are alternately energized and deenergized at the proper time by electrical connections illustrated in the wiring diagram which will now be explained in full.

The wiring diagram schematically shown in Figs. 29, 29A, 29B, 29C, 29D when arranged end to end as shown in Fig. 30, includes a stepping relay SR (Fig. 29) and a plurality of switch actuating relays R1 to R23 inclusive, the function of which will be explained before explaining their operation. All of these relays are normally deenergized.

R1 is controlled by the operation of the can stop element 141 when the tray G is full of cans and through switches of its own cuts out the stop element after a full row has been formed and energizes R6 for the next step in the operation of the apparatus.

R2 partially controls the raising of the feed belt 211 and extends the can stop pin 146 to hold the cans in the chute F.

R3 functions the same as R2 but for can stop pin 147 instead of pin 146.

R4 controls the release and lowering of both of the can stop pins 146, 147 to start the assembly of a new row of cans in the tray G and completes the circuits to actuate the feed belt 211.

R5 controls the position of the can stop element 141 for each row of cans alternately to effect the staggering of the cans in adjacent rows.

SR (the stepping relay) controls the energization and deenergization of R5 alternately for each row of cans assembled in the tray G and also controls R2, and R3 alternately to control the operation of the can stop pins 146, 147 in accordance with the location of the stop element 141 for the can staggering operation. SR includes a ratchet 440 (Fig. 29) rotated step-by-step by an SR core. The ratchet carries spaced cam projections 441 which upon alternate energizations of SR actuate two flip switches 507, 512.

R6 in conjunction with R2 or R3 controls the extension of the stop pins 146 or 147 into the chute F as mentioned above.

R7 controls the operation of the magnetic clutch 363 and the actuating motor 366 to raise the tray G one row height.

R8 controls the stepping relay SR, the tray raising circuits and the circuits which retracts the clamps 66.

R9 unlocks R8 when the tray G is lowered from its peak position to the floor of the car B and extends the can tier feeler 395 (Fig. 26) to locate the apparatus for the building up of a new tier.

R10 controls the operation of the tray lowering motors 64 to lower the tray G and forms the circuit to energize SR.

R11 controls the operation of the apparatus propelling motors 64 to move the apparatus toward the stack after a retraction therefrom for the location of a new tier of cans.

R12 controls the retraction of the tier feeler 395 (Fig. 26), controls lowering of the feed belt 211 in the tray G, and the extension of the stop pins 146 or 147 for a new tier of cans.

R20, R22 control switches to the reversible motor 366 which raises and lowers the tray G.

R21, R23 control switches to the reversible motors 64 which retracts and propels the entire apparatus.

TDR3 operates after an adjustable predetermined time lapse to control the distance the apparatus is rolled back away from the stack and to stop the motors 64 at the proper distance to provide for adequate clearance for the proper operation of the tier feeler 395 (Fig. 26).

TDR4 operates after a predetermined time lapse of about one and one half seconds to insure the full roll-back of the apparatus before the tray starts to move down after reaching its peak position so as to insure clearance of the row feeler 337 (Fig. 18) relative to the top row of cans in the built up tier, before the tray starts to move down.

All solenoids associated with slide valves are normally deenergized and with the exception of those controlled by relay switches, are energized only momentarily to shift the slide valve into a desired position. The valve remains in its shifted position after such a movement. Energizing of the solenoids is effected by snap switches which operate in one direction only and then only momentarily, although shown as ordinary switches in the drawings.

Solenoids associated with the relays are energized and deenergized through switches which require continued current and usually holding circuits through the relays to maintain the switches in open or closed condition.

In initially starting to build up a stack of cans in the car B or upon relocation of the apparatus for the starting of a new tier in a partially built up stack, the can stop pin 146 or 147 which ever was used last remains in extended and raised position to hold the incoming cans in the chute F and the feed belt 211 is in raised position, so as to prevent flow of cans into the tray G during the moving of the apparatus. Through previously formed electric circuits broken at the termination of a tier forming operation, the apparatus after being located for the starting of a new tier, is clamped in place by actuation of the clamps 66, the can stop pin 146 or 147 is retracted and the feed belt is lowered in readiness to begin a cycle of operation of the apparatus.

Starting of a row stacking cycle is effected by the closing of a start switch 450 (Fig. 29). When this switch is closed, electric current from a suitable source such as a generator 451 flows from lead line L1 to lead line L2. The motor 97 on the can turning device E starts. The motor 223 on the tray feed belt 221 starts. And a transformer 452 functions to feed reduced voltage current to the control devices through lead lines M1, M2.

Current immediately flows from L1A through a normally closed switch 512 of the stepping relay SR, through relay R5 to L2C to energize R5.

Relay R5 has a normally closed switch 515 controlling the stop element solenoid 143A for positioning the stop element 141 at the staggered position X—X in Fig. 3 and also has a normally open switch 514 controlling the solenoid 143 for positioning the stop element 141 at a normal position for starting a tier of cans as shown in Fig. 3.

Hence when R5 is energized, its switch 515 opens and its switch 514 closes to energize solenoid 143 through a circuit from M1, through closed switch 514, through solenoid 143 to M2C to energize solenoid 143 and thus effect the location of the stop element 141 for the starting of a tier of cans.

By reason of the stop pins 146 or 147 being retracted, cans roll from the chute F into the tray G and are advanced therealong by the lowered feed belt 211 until the tray is full. When a complete row has thus been assembled the leading can engages the can stop element 141 which thereupon closes switch 144. The closing of this switch energizes R1 through a circuit beginning at L1A, through switch 144, a normally closed switch 501 of R4, through R1 to L2A.

Energizing of R1 closes two normally open switches 502, 503 associated therewith.

Closing of switch 502 cuts out switch 144. Current flows from L1A, through switch 502 to and through switch 501, through R1 to L2A to hold R1 energized.

Closing of switch 503 energizes R6 by flow of current from L1A through switch 503, through a normally closed switch 504 (Fig. 29B) of R7 returning through R6 to L2A.

Energizing of R6 closes two normally open switches 505, 506 associated therewith.

Closing of switch 506 forms a holding circuit to hold R6 energized, through current from L1A through switch 506 (Fig. 29) through closed switch 504 (Fig. 29B) of R7 returning through R6 to L2A.

Closing of switch 505 energizes the relay R3 (Fig. 29) through a circuit from L1A through switch 505, through SR switch 507 through R3 to L2B.

Energization of R3 closes two normally open switches 508, 509 associated therewith.

Closing of switch 508 forms a circuit from M1A through switch 508 (Fig. 29) through solenoid 246 of the feed belt slide valve 242 to M2A to raise the feed belt 211 out of contact with the cans in the tray G to relieve the advancing pressure on the row of cans now assembled in the tray.

Closing of switch 509 forms a circuit from M1A through switch 509, through solenoid 179 of the stop pin slide valve 172 (Fig. 29) to M2B, to project or extend the stop pin 146 into the chute F to hold back the cans in the chute.

Projection of the stop pin 146 into the chute F momentarily closes the normally open switch 180 (Figs. 12, 13, 29) to form a circuit from M1B through switch 180 and solenoid 208 of the stop pin lifter slide valve 202 to M2B to raise the stop pin 146 and the cans held back thereby in the chute F to segregate the cans in the chute from the complete row of cans in the tray G.

The raising of the stop pin 146, momentarily closes the normally open switch 291 (Figs. 12 and 29) and this establishes a circuit from M1B through switch 291, through the solenoid 289 of the gate 254 lifter slide valve 286 (Fig. 29A) to M2D to raise the gate 254 as hereinbefore mentioned.

When the gate 254 is fully raised it contacts and momentarily closes the normally open snap switch 304 (Figs. 20 and 29A) to actuate the holding element 252 and the shelf 253.

Closing of switch 304 sets up a circuit from M1D (Fig. 29C) through the solenoid 315 of the shelf actuating slide valve 312 and through the solenoid 301 of the holding element slide valve 296, through the closed switch 304 to M2D (Fig. 29A) to extend or push the holding element 252 and the shelf 253 simultaneously into position over the tier of cans being built up to deposit the cans in the tray G onto the tier or onto the floor of the car B as in the starting of a tier.

Near the end of this pushing stroke, the lug 334 (Fig. 29C) on the holding element piston rod 267 engages and closes a normally open one way switch 333 which establishes a circuit from M1E (Fig. 29C) through the switch 333 and solenoid 331 of the tray support member slide valve 326, to M2E to energize the solenoid 331 to lower the tray support member 251 about one inch to locate the shelf 253 near the top row of cans in the tier.

At the end of the down stroke of the tray support member 251 a lug 523 (Figs. 20 and 29C) on the member, engages and closes a normally open snap switch 317 and this sets up a circuit from M1E through the switch 317, through the solenoid 316 of the shelf actuating slide valve 312, to M2G to withdraw the shelf 253 from under the row of cans.

The return of the shelf 253 momentarily closes the snap switch 305 and sets up a circuit from M1G (Fig. 29C), through switch 305, through solenoid 332 of the tray actuating slide valve 326 to M2E to raise the tray support element 251 about one inch to its original position and simultaneously extends the circuit through solenoid 302 of the holding element slide valve 296 to M2H to withdraw the holding element 252.

Return of the holding element 252 causes the lug 334 on its piston rod 267 to engage and momentarily close one way snap switch 292 (Fig. 29C) setting up a circuit from M1E (Fig. 29C) through switch 292, through solenoid 290 (Fig. 29A) of the gate actuating slide valve 286 to M2D to lower the gate 254 for the subsequent formation of the next row of cans in the tray G.

Lowering of the gate 254 completes the operations of forming and stacking one row of cans and sets the stage for raising the tray one can row height for the next row of cans.

While gate 254 is raised (Fig. 18) and as it starts to lower, block 348 holds switch 349 (Figs. 18, 19, 29B) against a contact 526 to establish a circuit from L1B through switch 349, contact 526, normally closed switch 527 (Fig. 29A) of the relay R8, through a normally closed snap switch 377 (Figs. 25 and 29B), through relay R7 to L2D to energize R7. When the row feeler engages the cans in the top row of the tier (Fig. 19), block 348 stops and gate 254 continues to lower thus permitting switch 349 to close against contact 533.

Energizing of R7 opens switch 504 to break the circuit through R6 to deenergize R6 and thus deenergize R3 so as to deenergize solenoid 246 of the feed belt slide valve 242 and to deenergize solenoid 179 of the stop pin 146 slide valve 172 and to deenergize solenoid 208 of the pin lifter slide valve 202 to prepare the circuits for a lowering of the feed belt and a withdrawal and lowering of the can stop pin 146 from the chute F.

Energizing of R7 also closes three switches 530, 531, 532 associated therewith.

Closing of switch 531 sets up a circuit from L1C (Fig. 29B) through switch 531, through switch 527 (Fig. 29A) of R8, switch 377 and R7 to L2D to hold R7 energized.

Closing of switch 530 (Fig. 29B) sets up a circuit from L1B through switch 349 and contact 533, through switch 530, through a rectifier 534, through the magnetic clutch 363 (Figs. 23 and 29B) to L2E to energize the magnetic clutch.

Closing of switch 532 energizes R20 (Fig. 29B) to provide for the starting of the tray lifter motor 366 (Figs. 23 and 29B) to raise the tray one can row height. This is effected by a circuit from L1D through a normally closed switch 606 of R8 (Fig. 29A), through switch 532, through R20 (Fig. 29B) to L2G.

Energization of R20 closes two normally open switches 540, 541 (Fig. 29B) which forms an interlock which starts the tray raising motor 366, energizes R4, and energizes SR. This is brought about by the setting up of a circuit from L1E (Fig. 29B), through switch 540, through the motor 366, through switch 541 to and through normally closed switch 536 of R10 (Fig. 29A), branching off one way to and through R4 (Fig. 29) to L2A to energize R4 and branching off another way to and through a normally closed switch 601 of R9 (Fig. 29A), a normally closed switch 602 of R8, through SR to L2A.

Energizing of R4 (Fig. 29) opens its normally closed switch 501 and closes a normally open switch 537.

Opening of R4 switch 501 breaks the holding circuit through R1 and thereby deenergizes R1 and opens R1 switches 502, 503. This sets up a chain action which cuts out R6, and R3. This cuts out all of the circuits which were utilized to operate the can stop pin 146, the raising of the feed belt 211, the holding element 252, the shelf 253, the tray support member 251 and the gate 254, and thus clears the stage for a repeat establishment of these circuits through R2 instead of R3 so as to effect the staggering of the next row of cans and to bring the can stop pin 147 into operation instead of the pin 146.

The closing of R4 switch 537 lowers the feed belt 211 into can feeding position in the tray G, lowers and retracts the can stop pin 146 from chute F to reestablish the flow of cans into the tray, and holds the can stop pin 147 in retracted position.

Lowering of the feed belt is effected through a circuit from M1J (Fig. 29) through closed R4 switch 537 to and through solenoid 245 of the feed belt slide valve 242 to M2A. Electric current through switch 537 also flows to and through solenoid 207 of the pin lifter slide valve 202 to M2B to lower the pin 146. Through switch 537 the current also flows through solenoid 178 of pin 146 slide valve 172 to M2B to retract pin 146 and through solenoid 189 of pin 147 slide valve 184 to M2A to hold pin 147 retracted.

The energization of the stepping relay SR through the closing of the R20 switches 540, 541, causes SR switch 512 to close against a contact 517 and SR switch 507 to close against a contact 516. The switches 512, 507 remain in this position throughout the next or second cycle of operation of the apparatus.

Closing of switch 512 against contact 517 breaks the circuit through R5 and thereby deenergizes R5 and opens its switch 514 and closes its switch 515. This deenergizes the can stop element solenoid 143 and energizes the solenoid 143A to shift the can stop element 141 into the position X—X in Fig. 3 to provide for assembling this next row of cans in staggered relation to the first row.

The closing of the SR switch 512 against contact 517 also partially sets up a reenergizing circuit through R8 and R9 which will be hereinafter explained in connection with the energizing of R8 and R9.

The closing of SR switch 507 against contact 516 prepares a circuit through R2 and cuts out R3, when R6 is again energized for this second row of cams as will hereinafter be explained.

Rotation of the motor 366 rotates the clutch plate 379, through the energized magnetic clutch 363, until a projection 378 on the plate engages and opens switch 377. This deenergizes R7 and breaks the circuit through the opening of switch 532 to the motor 366 and causes the motor to stop, opens switch 530 to break the circuit through the magnetic clutch 363, breaks the circuit through the open switch 531 to break the holding circuit to R7. Breaking of the motor circuit deenergizes R4 to open its switch 537 and close its switch 501 to prepare the circuit through switch 144 for the next cycle of operation.

Hence with the circuits thus prepared for this second row of cans, the second row upon being fully assembled engages the can stop element 141 and closes its switch 144 to reenergize R1 as mentioned above and this reenergizes R6 through the closed switch 504 of R7, and thus sets up a circuit from L1A through switch 505 of R6, through SR switch 507 and contact 516 to and through R2 to L2A to energize R2.

Energization of R2 closes its two normally open switches 518, 519.

Closing of switch 518 sets up a circuit from M1C (Fig. 29) through switch 518 to and through solenoid 246 of the feed belt 211 slide valve 242 to M2A to energize the solenoid 246 and thus raise the feed belt 211 out of the tray G.

Closing of switch 519 sets up a circuit from M1C (Fig. 29) through switch 519 to and through solenoid 190 of the stop pin 147 slide valve 184 to M2A to energize solenoid 190 and thus project the pin 147 into the chute F to hold back the cans in the chute in the same manner as with pin 146.

The projection of pin 147 into the chute F closes the normally open snap switch 180A to set up a circuit from M1B (Fig. 29) through the switch 180A to and through solenoid 208 of the pin lifter slide valve 202 to M2B to enerigze solenoid 208 and thus raise the pin 147 to segregate the assembled cans in the tray.

From this point on, the same circuits which follow the raising of the pin 146, are reestablished in succession as hereinbefore explained to actuate the tray holding element 251, the holding element 252, the shelf 253 and the gate 254 to stack the second row of cans on top of the first row in staggered relation.

At the termination of this second row stacking cycle, i.e. when the energization of R20 closes its two switches 540, 541 to start the tray raising motor 366, to energize R4 and SR, the stepping relay mechanism operates through the second energization of SR to return the SR switches 507, 512 to their original positions as shown in Fig. 29 to reenergize R5 and stop element solenoid 143 to return the stop element 141 to its original position for the third row of cans and to cut out R2 and return control through R3 to return the can stop pin 146 to operating condition and cut out pin 147.

This completes the circuits utilized for the assembly and stacking of the rows of cans individually. When a full height tier of cans is thus built up through a repetition of the foregoing operations, the apparatus is unclamped, and the tray G is moved back, away from the tier to free the feeler 337, and lowered for the purpose of starting and building up a new tier in the same manner as hereinbefore explained.

Hence when the last or top row of a tier is placed in position and the tray motor 366 is started to raise the tray G, the tray starts to move up and in so doing the lug 389 on the tray carrying chains 353 engages and closes the normally open switch 391 (Fig. 29B) and establishes a circuit from L1F (Fig. 29B) through switch 391, through normally closed switch 543 of R9 (Fig. 29A), through R8 to L2H. This energizes R8 and causes R8 to control the circuits ordinarily effected through R7.

Energizing of R8 opens its normally closed switches 527, 602 and 606 and closes four normally open switches 545, 546, 553, 604.

Opening of switch 527 breaks the circuit through R7 and insures against reenergization of R7.

Opening of switch 602 breaks the circuit through R6 and R4 and insures against energization of these relays.

Opening of switch 606 breaks the circuit through R20 and thus stops the tray raising motor 366 to prevent further raising of the tray G.

The closing of switch 545 retracts the clamps 66 from the sides of the car B to release the apparatus for movement away from the tier of cans. This is effected by a circuit from M1K (Fig. 29A) through solenoid 83 of the clamp actuating slide valve 74, through switch 545 of R8 to M2D.

The same closed switch 545 sets up a continuing circuit through the solenoid 246 (Fig. 29) of the feed belt slide valve 242 to M2A to raise the feed belt in the tray G.

Closing of switch 546 starts the propelling motors 64 in reverse direction to move the entire released apparatus back, away from the tier of cans, to permit lowering of the tray G. This starting of the two motors 64 is effected through a circuit starting at L1G (Fig. 29A) through switch 546 of R8, through a normally closed switch 547 of R11 (Fig. 29D), through a normally closed switch 548 of TDR3, through the motor starting relay R21 to L2J to energize R21.

Energizing of R21 closes two normally open switches 551, 552 to set up a circuit from L1H (Fig. 29D) through switch 551, to and through the two motors 64, through switch 552 to L2J. This starts the motors 64.

The closing of R8 switch 553 energizes TDR3 through a circuit from L1G (Fig. 29A) through switch 553, through a normally closed switch 543 of R9, through TDR3 (Fig. 29D) to L2J.

This switch 553 also forms a holding circuit from L1G (Fig. 29A), through switch 553 of R8, through switch 543 of R9, to and through R8 to L2H to hold R8 energized.

TDR3 is adjusted for a predetermined roll back of the apparatus, a distance substantially equal to the depth of the can row plus a clearance and at the termination of this roll back, i.e. after a predetermined time lapse, TDR3 opens its switch 548 and thereby breaks the circuit through R21 which thereupon opens its switches 551, 552 and stops the motors 64.

Simultaneously with the closing of R8 switch 553 and the energizing of TDR3, the second time delay relay TDR4 (Fig. 29D) is energized to close a normally open switch 555 of TDR4. Energizing of TDR4 is effected through a circuit from switch 547 of R11 (Fig. 29D) through the switch 548 of TDR3, through TDR4 to L2K.

Closing of switch 555 of TDR4 energizes R10 (Fig. 29A) as will be hereinafter explained.

Closing of the last R8 switch 604 provides for the energizing of SR to relocate the stop element 141 in case it needs relocating, i.e. if SR switch 512 is closed against 517. This sets up a circuit from L1A (Fig. 29) through switch 512, contact 517, through R8 switch 604, through SR to L2A to energize SR if it is required.

After approximately one and one half seconds after

TDR4 has been energized its switch 555 closes and sets up a circuit from L1G (Fig. 29A) through TDR4 (Fig. 29D) through a normally closed switch 556 of R9 (Fig. 29A) through R10 to L2H to energize R10.

Energization of R10 closes two normally open switches 557, 558 associated therewith.

Closing of R10 switch 557 sets up a circuit from L1G (Fig. 29A) through switch 557, through R22 (Fig. 29B) to L2G to energize R22.

Energization of R22 closes three normally open switches 561, 562, 563 associated therewith.

Closing of R22 switches 561, 562 establishes a circuit from L1E (Fig. 29B) through switch 561, through the tray actuating motor 366, through switch 562 to L2G to start the motor 366 in reverse.

Closing of R22 switch 563 sets up a circuit from L1E (Fig. 29B) through switch 563, through the rectifier 534 and magnetic clutch 363 to L2E. This energizes the magnetic clutch 363 and rotates the clutch plate 369 (Figs. 23, 25) in reverse due to the reverse rotation of the motor 366, while the pawl 383 holds the measuring plate 379 stationary to lower the tray G in one continuous sweep from the top of the car B to its floor to start a new tier of can rows.

During this tray lowering operation R10 is held energized through a holding circuit from L1G (Fig. 29A) through R10 switch 558, through R9 switch 556, through R10 to L2H.

When the tray G reaches the floor of the car B, the lug 389 (Fig. 29B) on the tray carrying chains 353 engages and closes a normally open switch 393 and thereby sets up a circuit from L1F (Fig. 29B) through the switch 393, through R9 to L2H (Fig. 29A) to energize R9.

R9 cannot be again deenergized until the tray G has deposited the first row of cans on the car floor and moves up for the second row. Then switch 393 will open and deenergize R9.

Energization of R9 opens its normally closed switches 543, 556 and 601 and closes two normally open switches 565, 605 associated therewith.

Opening of R9 switch 556 breaks the circuit through R10 to deenergize R10 and open its switches 557, 558.

Opening of R10 switch 558 breaks the R10 holding circuit and opening of R10 switch 557 deenergizes R22 and thus opens its switches 561, 562 which cuts out the tray actuating motor 366 and thus stop further descent of the tray G.

Opening of R9 switch 601 breaks the circuit connecting SR with the interlock switches 540, 541 of the tray motor 366 to prevent operation of SR or the motor.

Figure 29A:
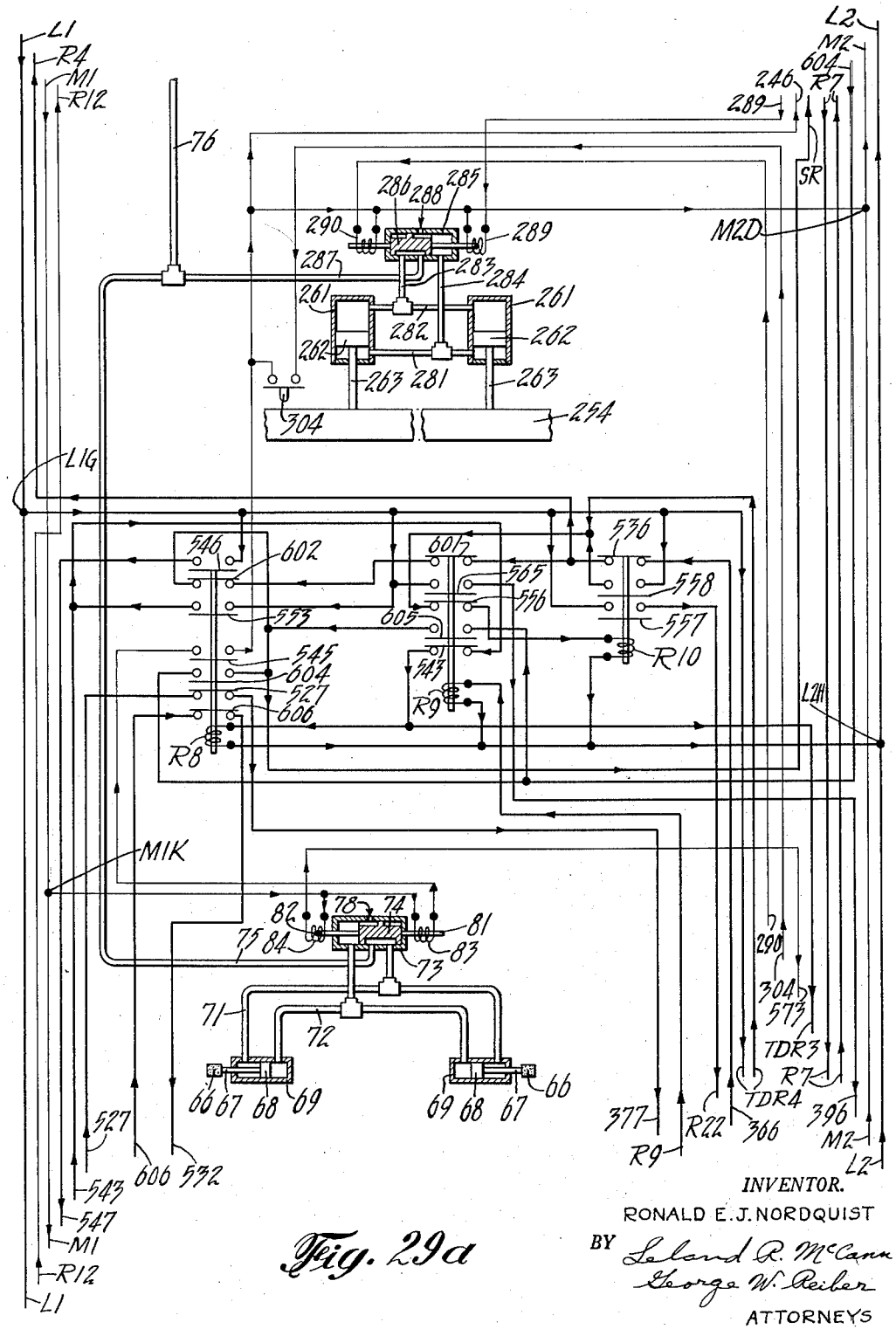
Figure 29C:
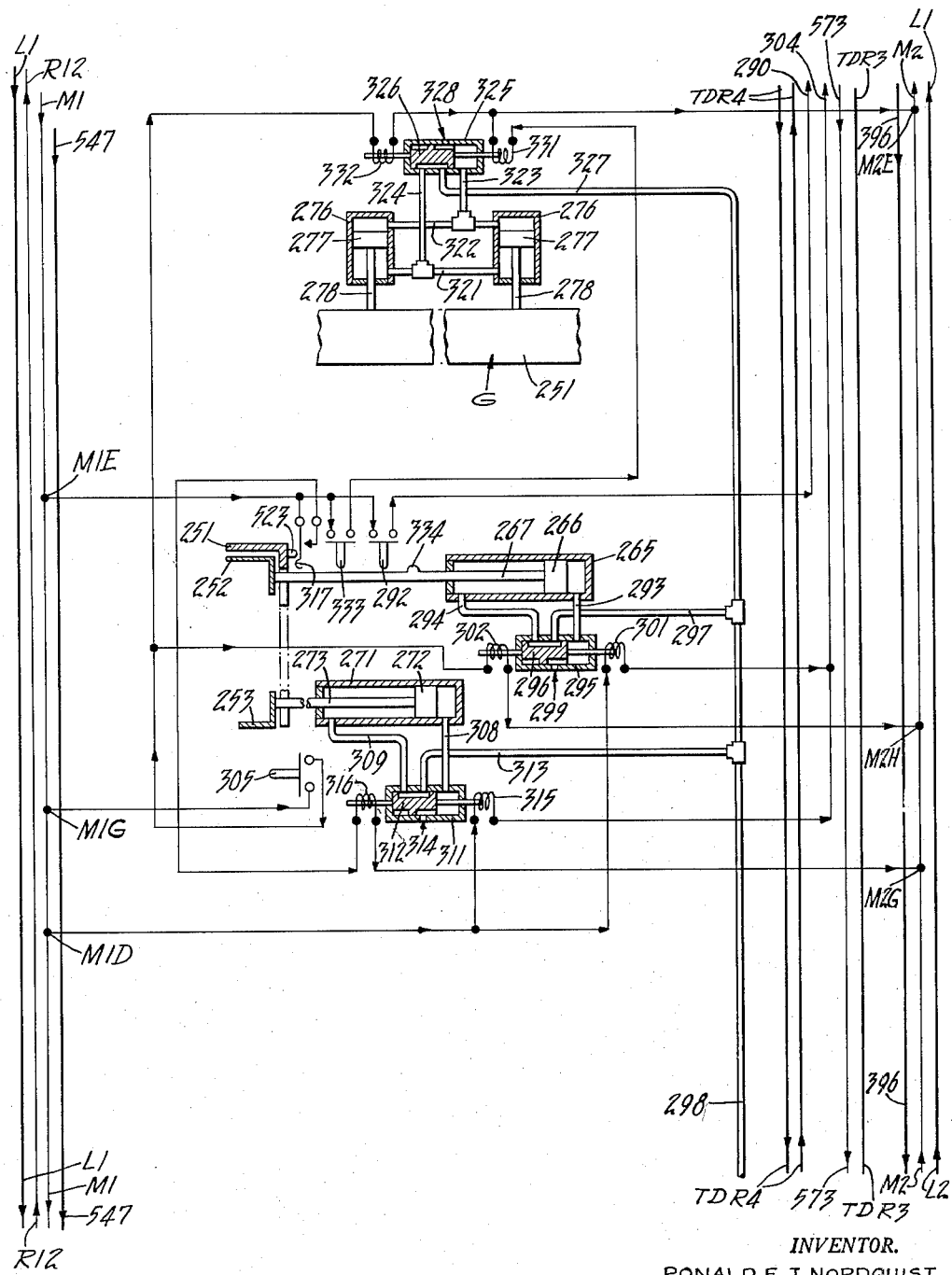

Opening of R9 switch 543 breaks the circuit through R8 to deenergize R8 and thereby return the R8 switches to their original condition as shown in Fig. 29A, and thereby sets the stage for subsequent control of the stacking operations by R7 as previously described.

Closing of R9 switch 605 takes over the function of R8 switch 604 when R8 is deenergized. This switch 605 sets up a circuit from L1A (Fig. 29) through SR switch 512 and contact 517, through R9 switch 605, through SR to L2A to energize SR if it is required.

The closing of R9 switch 656 energizes R11 (Fig. 29D) through a circuit from L1G (Fig. 29A) through R9 switch 565, through the tier feeler switch 396 (Fig. 29D) through a normally closed switch 566 of R12 through R11 to L2L (Fig. 29D) to energize R11.

Energization of R11 closes two normally open switches 567, 568 associated therewith.

Closing of switch 567 sets up a circuit from M1L (Fig. 29D) through solenoid 423 of the tier feeler slide valve 418, through switch 567 to M2J to energize solenoid 423 and extend the tier feeler 395 toward the built up stack of cans.

Closing of switch 568 establishes a circuit from L1M (Fig. 29D) through the switch 568, through R23 to L2J to energize R23.

Energization of R23 closes two normally open switches 571, 572 of R23 which sets up a circuit from L1H (Fig. 29D) through switch 571, through the propelling motors 64, through switch 572 to L2J to start the motors 64 in a forward direction to move the apparatus toward the stack.

As the tier feeler 395 engages and detects the last tier of cans built up in the stack, its forward movement is arrested and this opens its normally closed switch 396 (Fig. 29D) and closes its normally open companion switch 397.

Opening of switch 396 deenergizes R11 and thereby permits its switch 568 to open. This breaks the circuit through R23 and causes R23 to be deenergized to stop the motors 64 and thereby stop the apparatus in the proper place to build up the next tier of cans.

The closing of the companion switch 397 establishes a circuit from L1G (Fig. 29A) through switch 565 of R9, through switch 397 (Fig. 29D), through R12 to L2L to energize R12.

Energization of R12 closes three normally open switches 573, 574, 575 associated therewith.

Closing of R12 switch 573 sets up a circuit from M1L (Fig. 29D) through solenoid 422 of the tier feeler slide valve 418, through switch 573 to M2J to energize solenoid 422 and to thereby retract the feeler 395.

Closing of this switch 573 also sets up a circuit from M1K (Fig. 29A) through solenoid 84 of the clamping slide valve 74, through switch 573 to M2J (Fig. 29D) to extend the clamps 66 into clamping position against the slides of the car B to hold the apparatus in its newly located position.

Closing of R12 switch 574 sets up a circuit from L1G (Fig. 29A) through switch 565 of R9, through switch 574 (Fig. 29D), through R12 to L2L to hold R12 energized to prevent immediate reenergization of R11 through reclosing of the tier feeler switch 396 when the feeler is retracted. This prevents immediate restarting of the propelling motors 64.

This holding circuit for R12 is maintained until R9 is deenergized through the opening of the tray control switch 393 upon the raising of the tray G after the first row of cans is positioned in the new tier.

The closing of R12 switch 575 starts off the stacking cycle of the apparatus for the new tier of cans, by lowering the feed belt 211 into the tray G and lowering and retracting the can stop pins 146, 147 to permit the cans from the chute F to flow into the tray. This is effected by a circuit from M1M (Fig. 29D) through the closed switch 575 of R12, to and along the lead wire from the open switch 537 of R4 (Fig. 29) to and through solenoid 245 of the lead belt slide valve 242 to M2A, to energize the solenoid 245 to lower the feed belt 211.

This same circuit beyond the R4 switch 537 branches off to and through solenoid 207 of the pin lifter slide valve 202 to M2B to energize the solenoid 207 to lower the pins 146, 147. From the solenoid 207, the circuit branches off to and through the solenoid 178 of the pin 146 slide valve 172 to M2B and branches off to and through the solenoid 189 of the pin 147 slide valve 184 to M2A to energize both solenoids 178, 189 to retract both pins 146, 147 to insure retraction of the pin which was left holding the cans in the chute F in accordance with the operation of the stepping relay SR.

The cans from the chute F thus fill the tray G and operate the stop element switch 144 as hereinbefore explained, which thereby reestablishes the circuits through R1, R2, or R3, R4, R6 to effect the operations of the tray G, the holding element 252, and shelf 253 to effect the stacking of a row of cans. Upon completion of the first stacking operation in this second tier, i.e. when R20 is energized to start the tray motor 366 to raise the tray G one can row height, the raising of the tray immediately opens switch 393 (Fig. 29B) through the moving of the tray carrying chain lug 389 away from the switch 393, and this breaks the circuit through switch 565 of R9 and thereby deenergizes R9 and permits the R9 switches to return to their original condition as shown in Fig. 29A. This immediately deenergizes R12 and permits its switches to return to their original condition as shown in Fig. 29D.

Hence the return of the R9 and R12 switches sets the stage for the return of all the circuits to function as originally explained for repeat cycles of operation to assemble and stack row upon row of cans to build up the second tier of cans. Thereafter each tier of cans is built up in the same manner until the stack is complete and the apparatus stopped and removed from the car B.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for stacking cans into freight cars and other restricted places for shipment and storage with the cans horizontally disposed in stepped row and tier formation comprising a frame movable into position adjacent an end wall of said freight car in spaced relation thereto, a back support for the first tier of cans disposed in a plane extending upwardly and inclined toward said end wall, elevator means on said frame, a horizontal tray having a retractable bottom wall for receiving cans thereon, said tray being movably supported on said elevator means and extending across said freight car for substantially the full width of the car, said elevator means being inclined for moving said tray in a path substantially parallel to said plane of the back support, means for assembling in said tray a single solid row of cans, means for projecting said filled tray forward from said elevator means toward said inclined back support to position said assembled row of cans over the place on which it is to be deposited, means for retracting said bottom wall of the tray to release therefrom the entire row of said cans simultaneously to rest in horizontal position and set back relative to cans in the next lower row, and means for actuating said elevator in steps each equal to a distance substantially that of the height of one can row to elevate said tray when empty to a position above the previously deposited row for a repeat cycle of operation to build up row upon row in said car a substantially vertical tier of a plurality of stepped rows of cans.

2. An apparatus for stacking cans into freight cars and other restricted places for shipment and storage with the cans horizontally disposed in stepped row and tier formation comprising a frame movable into position adjacent an end wall of said freight car in spaced relation thereto, a back support for the first tier of cans disposed in a plane extending upwardly and inclined toward said end wall, vertically disposed elevator means on said frame, a horizontal tray movably supported on said elevator means and extending across said freight car for substantially the full width of the car, means for supporting and guiding rolling cans into said freight car and longitudinally thereof toward its end to be filled, a can turning device on said frame close to the top of said car, means for elevating said cans to said turning device, said device including gripper means for gripping an end of a can and for swinging it bodily in substantially a horizontal plane into a position for feedng to said tray, means for assembling in said tray a single solid row of cans, means for projecting said filled tray forward from said elevator means toward said inclined back support to position said assembled row of cans over the place on which it is to be deposited, means for releasing said row of cans from said tray to rest in horizontal position and set back relative to cans in the next lower row, and means for actuating said elevator through a distance substantially equal to the height of one can row to elevate said tray when empty to a position above the previously deposited row for a repeat cycle of operation to build up row upon row in said car a vertical tier of a plurality of stepped rows of cans.

3. An apparatus of the character defined in claim 2 wherein said gripper means is a horizontally disposed rotatable magnetic wheel.

4. An apparatus for stacking cans into freight cars and other restricted places for shipment and storage with the cans horizontally disposed in stepped row and tier formation comprising a frame movable into position adjacent an end wall of said freight car in spaced relation thereto, a back support for the first tier of cans disposed in a plane extending upwardly and inclined toward said end wall, vertically disposed elevator means on said frame, a horizontal tray movably supported on said elevator means and extending across said freight car for substantially the fully width of the car, means for assembling in said tray a single solid row of cans, means for projecting said filled tray forward from said elevator means toward said inclined back support to position said assembled row of cans over the place on whch it is to be deposited, means for releasing said row of cans from said tray to rest in horizontal position and set back relative to cans in the next lower row, means for actuating said elevator through a distance susbtantially equal to the height of one can row to elevate said tray when empty to a position above the previously deposited row for a repeat cycle of operation to build up row upon row in said car a vertical tier of a plurality of stepped rows of cans, frame moving means operable by said means at the upper limit of travel of said tray for moving said frame back away from a built-up tier of cans a predetermined distance greater than the depth of a row of said cans, means for reversing the direction of travel of said frame to move said frame toward said built-up tier of cans, tier feeler means carried by said frame and projectable from said frame and beyond said tray toward said built-up tier of cans, and actuating means operable by said projected tier feeler upon engagement of said feeler with said tier during movement of the frame toward said tier for retracting said feeler and stopping said frame moving means to stop and thereby locate said frame in a predetermined position relative to said built-up tier of cans for the building up of an adjacent tier of cans.

5. An apparatus of the character defined in claim 4 wherein there is provided means for shifting said frame into a predetermined stacking position for the building up of a tier of cans, and wherein there is provided clamping elements mounted on said frame, and means operable by said feeler and associated means upon engagement of the feeler with said tier for extending said clamping elements laterally into engagement with the sides of said freight car for holding said frame in a located stacking position.

6. In an apparatus for stacking cans row-by-row in tier formation into freight cars and other restricted places for shipment and storage, a can row assembly and stacking tray, comprising a tray support member, a horizontally movable L-shaped can shelf member carried on said support member for carrying a row of cans to be stacked on a vertical tier of cans, an inverted L-shaped can holding element mounted on said support member and normally disposed above said shelf member, said L-shaped shelf member and inverted L-shaped holding element extending substantially the length of said tray and confining the cans thereon at bottom, top and one side thereof, separate actuating means for said shelf member and said holding element for projecting said shelf member and said holding element toward the tier of cans for deposit thereonto of the row of cans on said shelf member and for retracting said member and said element to their original positions for a repeat operation for a subsequent row of cans, and means for controlling said actuating means to project said shelf member and said holding element simultaneously to carry said row of cans into stacking position, then to retract said shelf member from under said row of cans while retaining said holding element in its projected position to deposit said row of cans onto said tier and to hold them against return with said shelf member and then to retract said holding element clear of said deposited row of cans on the tier.

7. An apparatus of the character defined in claim 6 wherein there is provided a can row feeler device mounted on said tray and engageable against the uppermost sides of the cans of each row after it is placed in a tier, tray moving means for raising and lowering said tray relative to said elevator, and control devices connecting with said feeler device and with said tray moving means for lowering the tray when said conveyor is stopped and until said feeler device engages the cans beneath it to locate the row of cans on the tray at the proper level for delivery to the tier.

8. An apparatus of the character defined in claim 6 wherein there is provided a movable gate disposed along the open side of said tray for guiding said cans along the tray as they are fed thereto, and means actuated by the cans in said tray when a complete row is ssembled therein to remove said gate clear of said tray to facilitate stacking delivery of said row of cans from said from said open side of the tray.

9. In an apparatus for stacking cans row-by-row in tier formation into freight cars and other restricted places for shipment and storage, a horizontal tray for receiving and supporting a row of cans to be stacked in row-upon-row tier formation elevator, means for supporting said tray and for elevating said tray row-by-row as said tier is built up, means for horizontally shifting said tray relative to said elevator means for each row of cans to position the row of cans carried by said tray into vertical alignment with the other rows in said tier for deposit thereonto, and means for vertically shifting said tray in horizontal position independently of said elevator means to lower said tray to a position close to the tier below it to facilitate deposit of said row of cans onto said tier and for thereafter raising said tray clear of said deposited cans to facilitate retraction of said tray for a repeat operation.

10. An apparatus for stacking cans into freight cars and other restricted places for shipment and storage with the cans horizontally disposed in row and tier formation, comprising a frame movable into position adjacent an end wall of said freight car in spaced relation to said wall, a substantially vertically disposed elevator means on said frame, a horizontal tray movably supported on said elevator means and extending across said freight car for substantially the full interior width of the car, means for feeding cans into said tray at an entrance end thereof and for propelling them along the tray toward the far end of the tray to form a single solid row of cans thereon, a can stop element located at the far end of said tray and operable by the leading can in said row for locating said row of cans in a predetermined position longitudinally of said tray, a can stop device including a pin movable into and out of can stopping and supporting position with cans at the entrance end of said tray, actuating means for alternately changing the longitudinal position of said stop element relative to the far end of said tray and for projecting said can stop device into the path of travel of the cans entering said tray for limiting the number of cans in each row and for locating each row in staggered relation relative to the preceding row, means for projecting said filled tray forward from said elevator means toward said wall of the car to position each row of cans over the place on which it is to be deposited, means for releasing said row of cans from said tray for deposit in horizontal position in the car, and means for actuating said elevator through a distance substantially equal to the height of one can row to elevate said empty tray to a position above the previously deposited row for a repeat cycle of operation to build up row-by-row in said car a vertical tier of a plurality of rows of cans.

11. An apparatus of the character defined in claim 10 wherein there is provided means for lifting said can stop device when in can stopping and supporting position after a row of cans has been assembled on the tray to lift the stopped and supported cans free of the row of cans assembled in said tray.

12. An apparatus of the character defined in claim 10 wherein said can stop device comprises a first movable pin operable by said actuating means for alternate rows of cans and a second movable pin spaced from said first pin and operable by said actuating means for the in-between rows of cans.

13. An apparatus of the character defined in claim 10 wherein there is provided a feeding device comprising a continuously moving belt adjacent the entrance end of said tray with a run of said belt extending along the path of travel of said cans in said tray for propelling said cans toward the far end of said tray to insure formation of a solid row of cans in said tray, and means for shifting said run of the belt into and out of feeding relation with said cans in timed relation with the movement of said pins.

14. An apparatus of the character defined in claim 13 wherein there is provided means operable by said can stop element for shifting said feeding device out of feeding relation with said cans.

References Cited in the file of this patent

UNITED STATES PATENTS

| | | |
|---|---|---|
| 1,983,471 | Kramer | Dec. 4, 1934 |
| 2,135,805 | Evans et al. | Nov. 8, 1938 |
| 2,264,348 | Weygant | Dec. 2, 1941 |
| 2,535,828 | Ardron | Dec. 26, 1950 |
| 2,623,628 | Jones | Dec. 30, 1952 |
| 2,639,823 | Madden | May 26, 1953 |
| 2,647,645 | Pierce | Aug. 4, 1953 |
| 2,659,495 | Botley | Nov. 17, 1953 |
| 2,703,653 | Thomson | Mar. 8, 1955 |
| 2,765,599 | Johnson | Oct. 9, 1956 |
| 2,768,756 | Horman | Oct. 30, 1956 |

FOREIGN PATENTS

| | | |
|---|---|---|
| 553,790 | France | Feb. 16, 1923 |